(12) United States Patent
Bayer et al.

(10) Patent No.: US 7,778,841 B1
(45) Date of Patent: Aug. 17, 2010

(54) SYSTEM AND METHOD FOR GENERATING INFORMATION RELATING TO HISTORIES FOR A PLURALITY OF VEHICLES

(75) Inventors: Gerald A. Bayer, Scottsdale, AZ (US); Richard T. Raines, Arlington, VA (US)

(73) Assignee: Carfax, Inc., Centreville, VA (US)

( * ) Notice: Subject to any disclaimer, the term of this patent is extended or adjusted under 35 U.S.C. 154(b) by 1804 days.

(21) Appl. No.: 10/839,757

(22) Filed: May 6, 2004

Related U.S. Application Data

(63) Continuation-in-part of application No. 10/619,542, filed on Jul. 16, 2003.

(51) Int. Cl.
*G06Q 10/00* (2006.01)

(52) U.S. Cl. ............................................. 705/1; 705/29

(58) Field of Classification Search ...................... 705/1, 705/28
See application file for complete search history.

(56) References Cited

U.S. PATENT DOCUMENTS

| | | | |
|---|---|---|---|
| 4,989,144 | A | 1/1991 | Barnett et al. |
| 5,001,714 | A | 3/1991 | Stark et al. |
| 5,127,005 | A | 6/1992 | Oda et al. |
| 5,361,201 | A | 11/1994 | Jost et al. |
| 5,493,729 | A | 2/1996 | Nigawara et al. |
| 5,521,815 | A | 5/1996 | Rose, Jr. |
| 5,598,511 | A | 1/1997 | Petrinjak et al. |
| 5,899,978 | A | 5/1999 | Irwin |
| 5,899,985 | A | 5/1999 | Tanaka |
| 5,917,405 | A | 6/1999 | Joao |
| 6,052,631 | A | 4/2000 | Busch et al. |
| 6,076,064 | A | 6/2000 | Rose, Jr. |
| 6,098,061 | A | 8/2000 | Gotoh et al. |
| 6,259,354 | B1 | 7/2001 | Underwood et al. |
| 6,397,131 | B1 | 5/2002 | Busch et al. |
| 6,505,106 | B1 | 1/2003 | Lawrence et al. |
| 7,113,853 | B2 * | 9/2006 | Hecklinger .................. 701/35 |
| 2002/0016655 | A1 | 2/2002 | Joao |

(Continued)

OTHER PUBLICATIONS www.kbb.com, "Kelley Blue Book," Condition Quiz—Appraise Your Own Vehicle, 2002 BMW 7 Series 745Li Sedan 4D, date printed Jun. 10, 2003.

(Continued)

*Primary Examiner*—Janice A. Mooneyham
*Assistant Examiner*—Michael J Fisher
(74) *Attorney, Agent, or Firm*—Marc S. Kaufman; Nixon Peabody, LLP

(57) ABSTRACT

System and method for generating information relating to a vehicle's history. In one embodiment, the method includes the steps of identifying target records in a database, determining a total number of owners for each vehicle based on the target records, and displaying a listing of the vehicles including corresponding number of owners. A step of determining and displaying the ownership type may be provided. A vehicle history information system is also provided, including a database having vehicle history records, a vehicle history report module adapted to retrieve the vehicle history record, an ownership module adapted to determine the number of owners for the vehicles based on the vehicle history records, and a user interface module adapted to generate a listing of the vehicles and the number of owners. The system may be adapted to determine and display the ownership type.

71 Claims, 14 Drawing Sheets

U.S. PATENT DOCUMENTS

| | | |
|---|---|---|
| 2002/0032626 A1 | 3/2002 | DeWolf et al. |
| 2002/0143646 A1 | 10/2002 | Boyden et al. |
| 2002/0194051 A1 | 12/2002 | Hall et al. |
| 2004/0243588 A1 | 12/2004 | Tanner et al. |
| 2004/0267818 A1 | 12/2004 | Hartenstine |
| 2005/0114270 A1 | 5/2005 | Hine et al. |
| 2005/0177337 A1 | 8/2005 | Beyer et al. |
| 2006/0015377 A1 | 1/2006 | Hoogs et al. |
| 2006/0149674 A1 | 7/2006 | Cook et al. |

OTHER PUBLICATIONS www.kbb.com, "Kelley Blue Book," Blue Book Trade-In Report, 2002 BMW 7 Series 745Li Sedan 4D, date printed Jun. 10, 2003.
www.kkb.com, "Kelley Blue Book," Trade-In, 2002 BMW 7 Series 745Li Sedan 4D, date printed Jun. 10, 2003.
www.edmunds.com, "Used Cars, 2001 BMW 7 Series, Used Car Appraiser, Step 1-Step 6," date printed Jun. 10, 2003.
auto.consumerguide.com, "The Truth About Cars," date printed Jun. 10, 2003.
"Powered by Intelliprice," 2001 BMW 7 Series 4D Sedan 740iL, specify vehicle to trade, pp. 1 of 1, date printed Jun. 10, 2003.
"Powered by Intelliprice," 2001 BMW 7 Series 4D Sedan 740iL, Verify Equipment, p. 1 of 1, date printed Jun. 10, 2003.
"Powered by Intelliprice," 2001 BMW 7 Series 4D Sedan 740iL, Describe the condition of your vehicle, p. 1 of 1, date printed Jun. 10, 2003.
www2.nadaguides.com, "Build and Price a New Car," Select Mileage & Options, pp. 1 of 2, date printed Jul. 12, 2004.
www.intellichoice.com, "Used Car Truck SUV Research by Make Model Price," pp. 1 of 2, date printed Jul. 14, 2004.
www.intellichoice.com, "2000 Mercury Mystique—Used Valuation," Vehicle Report, pp. 1 of 3, date printed Jul. 14, 2004.
www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.
www.kbb.com, "Kelley Blue Book," Blue Book Trade-in Report, 2002 BMW 7 Series 745 Li Sedan 4D, p. 1 of 2, date printed Jun. 10, 2003.
www.autotrader.com, "Used Cars, Sell Your Car, Auto Financing & Insurance," p. 1 of 1, date printed Jul. 12, 2004.
www.autotrader.com, "Used Cars for Sale: Step 2 of 2," p. 1 of 1, date printed Jul. 12, 2004.
www.autotrader.com, "Used Cars for Sale: Step 2 of 2," p. 1 of 2, date printed Jul. 12, 2004.
www.autotrader.com, "Used Cars for Sale: Car Details," pp. 1 of 2, date printed Jul. 12, 2004.
www.autotrader.com, "Find Your Car: Search Results," pp. 1 of 2, date printed Jul. 12, 2004.
www.cars.com, "Listings and research to connect you with the right car," pp. 1 of 2, date printed Jul. 12, 2004.
www.cars.com, "Search Results," pp. 1 of 2, date printed Jul. 12, 2004.
www.cars.com, "1989 Ford Mustang LX Sport," pp. 1 of 2, date printed Jul. 12, 2004.
www.carmax.com, "The Online Auto Superstore" Home Page, p. 1 of 1, date printed Jul. 12, 2004.
www.carmax.com, "The Online Auto Superstore: Quick Search," p. 1 of 1, date printed Jul. 12, 2004.
www.carmax.com, "The Online Auto Superstore: Search Results," pp. 1 of 2, date printed Jul. 12, 2004.
www.carmax.com, "The Online Auto Superstore: Clean Title," p. 1 of 1, date printed Jul. 12, 2004.
www.dchusedcars.com, "DCH Auto Group, Used Car CyberLot of New Jersey—Freehold, New Jersey," Inventory, p. 1 of 1, date printed Jul. 15, 2004.
www.dchusedcars.com, "DCH Auto Group, Used Car CyberLot of New Jersey—Freehold, New Jersey," Inventory-results, p. 1 of 1, date printed Jul. 15, 2004.
www.dchusedcars.com, "DCH Auto Group, Used Car CyberLot of New Jersey—Freehold, New Jersey," Certifications, pp. 1 of 3, date printed Jul. 15, 2004.
www.autos.yahoo.com, "New car prices, car pictures, car reviews, used cars, used car prices on Yahoo!," pp. 1 of 3, date printed Jul. 15, 2004.
www.used-cars.autos.yahoo.com, "Fairfax Used Cars BMW—Fairfax VA Used BMW Cars," pp. 1 of 3, date printed Jul. 15, 2004.
www.carprices.com, "Car Prices, New car prices, Used car prices, Auto financing and car research," pp. 1 of 2, date printed Jul. 15, 2004.
www.inventory.carprices.com, Match Maker, p. 1 of 1, date printed Jun. 23, 2003.
www.mbusa.com, "Find Starmark Certified pre owned Mercedes-Benz cars at mbusa.com," p. 1 of 1, date printed Jul. 15, 2004.
www.mbusa.com, Untitled, p. 1 of 1, date printed Jul. 15, 2004.
www.mbusa.com, "Search Results," for 2004 Convertible, pp. 1 of 2, date printed Jul. 15, 2004.
www.dealerhq.com, "Front Page," p. 1 of 1, date printed Jul. 15, 2004.
www.carfax.com, "Don't buy a used car without CARFAX!," p. 1 of 1, date printed Nov. 8, 2004.
www.carfax.com, "Carfax Vehicle History Report," pp. 1-9, date printed Nov. 8, 2004.

* cited by examiner

VIN Check

Please enter the VIN you want a CARFAX Report for, so it can be validated before your order is processed.

FIG. 4

Ownership History:

CARFAX estimates that this 1998 FORD ESCORT SE (3FAFP15P9WR259859) has had 2 owner(s). CARFAX analyzed this vehicle's title history and other supporting events to identify potential ownership transfers. In compliance with the U.S. privacy laws, CARFAX does not collect or report owner names or addresses.

| Estimated Owners: | Date: | Location: |
| --- | --- | --- |
| 1st owner | 08/20/1998 | Pennsylvania |
| 2nd owner | 08/01/2002 | Virginia |

CARFAX Ownership History Price Adjustment® Patented

Buying or selling this vehicle? Based on this 1998 FORD ESCORT SE's 2 estimated owners and other ownership-related factors, you should adjust the base price of this vehicle by:

Two Owner 1998 Ford Escort SE     + $460

| Date: | Odometer Reading: | Source: | General Comments: |
|---|---|---|---|
| 02/28/2001 | | Virginia Motor Vehicle Dept. Chantilly, VA | Vehicle Owner Relocated |
| 03/09/2001 | 10,854 | Virginia Motor Vehicle Dept. Chantilly, VA | Title or registration issued |
| 12/20/2001 | | Auto Inventory Chantilly, VA | Vehicle offered for sale |
| 03/10/2003 | 23,881 | Virginia Inspection Station Chantilly, VA | Passed emissions inspection |

502 → (row 2)
501
FIG. 9

/ 510

| Date: | Odometer Reading: | Source: | General Comments: |
|---|---|---|---|
| 02/12/2001 | | Buick Assembly Plant Smyrna, TN | Vehicle Assembled at GM Plant |
| 04/25/2001 | 15 | Maryland Motor Vehicle Dept. Baltimore, MD | Title or registration issued |
| 04/26/2001 | | Maryland Motor Vehicle Dept. Baltimore | Registered as corporate fleet vehicle |
| 06/01/2003 | 37,952 | Maryland Motor Vehicle Dept. Baltimore, MD | Title or registration issued |

516 → (row 1)
512 → (row 2)
514 → (row 3)

| Date: | Odometer Reading: | Source: | General Comments: |
|---|---|---|---|
| 03/05/2001 | | Buick Assembly Plant Smyrna, TN | Vehicle Assembled at GM Plant |
| 512 → 04/25/2001 | 15 | Maryland Motor Vehicle Dept. Baltimore, MD | Title or registration issued First Owner Reported |
| 04/26/2001 | | Maryland Motor Vehicle Dept. Baltimore | Registered as corporate fleet vehicle |
| 06/01/2003 | 37,952 | Maryland Motor Vehicle Dept. Baltimore, MD | Title or registration issued |

FIG. 10B 550   552

| Date: | Odometer Reading: | Source: | General Comments: | Comments For Patent Application |
|---|---|---|---|---|
| 554 → 04/25/2001 | 15 | Maryland Motor Vehicle Dept. Baltimore, MD | Title or registration issued <u>First Owner Reported</u> | Target Record 1<br><br>*Does not qualify as New Owner Record because is already a First Owner Record* |
| 563 → 05/27/2002 | 18,542 | Auto Inventory Bowie, MD | Vehicle offered for sale | *Trigger Record* |
| 562 → 06/11/2002 | | Automotive Services Company | Used vehicle sold | *Trigger Record* |
| 556 → 07/06/2002 | | Maryland Motor Vehicle Dept. Baltimore, MD | Title or registration issued | Target Record 2<br><br>*Eligible as a New Owner Record* |
| 05/12/2003 | | Maryland Inspection Station Baltimore, MD | Passed emissions inspection | |
| 558 → 06/01/2003 | 37,952 | Maryland Motor Vehicle Dept. Baltimore, MD | Title or registration issued | Target Record 3<br><br>*Eligible as a New Owner Record* |
| 564 → 06/01/2003 | | Service Plan Company | Service Plan Purchased | *Trigger Record* |

FIG. 11A

|      | Date: | Odometer Reading: | Source: | General Comments: |
|---|---|---|---|---|
| 554 → | 04/25/2001 | 15 | Maryland Motor Vehicle Dept. Baltimore, MD | Title or registration issued First Owner Reported |
|  | 05/27/2002 | 18,542 | Auto Inventory Bowie, MD | Vehicle offered for sale |
|  | 06/11/2002 |  | Automotive Services Company | Used vehicle sold |
| 556 → | 07/06/2002 |  | Maryland Motor Vehicle Dept. Baltimore, MD | Title or registration issued New Owner Reported ← 556 |
|  | 05/12/2003 |  | Maryland Inspection Station Baltimore, MD | Passed emissions inspection |
| 558 → | 06/01/2003 | 37,952 | Maryland Motor Vehicle Dept. Baltimore, MD | Title or registration issued New Owner Reported ← 556 |
|  | 06/01/2003 |  | Service Plan Company | Service Plan Purchased |

| Year | Vehicle | Price | Mileage | Photo | Seller | Body | Color | Distance | # of Owners | Type of Owner | Compare |
|---|---|---|---|---|---|---|---|---|---|---|---|
| 2003 | Acura NSX T | $79,900 | 9,500 | 📷 | Exclusive Online Classified | Coupe | Silver | 3 mi. | 1 | Rental | ☐ |
| 1997 | Acura NSX T | $49,995 | 58,060 | 📷 | Radley Acura | Coupe | Blue | 15 mi. | 3 | Private, Lease | ☐ |
| 1996 | Acura NSX T | $40,995 | 43,569 | 📷 | Fairfax Motors, Inc. | Coupe | White | 4 mi. | 2 | Private | ☐ |
| 2003 | Acura MDX Touring | $40,988 | 20,000 | 📷 | Pohanka Acura | SUV | BLACK | 3 mi. | 1 | Private | ☐ |
| 2003 | Acura MDX Touring | $38,995 | 14,771 | 📷 | Karen Radley Acura VW | SUV | Sage | 16 mi. | 1 | Private | ☐ |
| 2004 | Acura RL 3.5 | $38,995 | 1,338 | | Karen Radley Acura VW | Sedan | White | 16 mi. | 1 | Private | ☐ |
| 2003 | Acura MDX Touring | $37,750 | 22,000 | | Exclusive Online Classified | SUV | Black | 13 mi. | 1 | Private | ☐ |
| 2002 | Acura MDX Touring | $36,995 | 23,204 | 📷 | Radley Acura | SUV | TanCertified | 15 mi. | 1 | Fleet | ☐ |
| 2002 | Acura MDX Touring | $36,995 | 36,448 | 📷 | Karen Radley Acura VW | SUV | Burgundy | 16 mi. | 2 | Fleet, Private | ☐ |
| 2002 | Acura MDX Touring | $36,995 | 32,076 | 📷 | Radley Acura | SUV | WhiteCertified | 15 mi. | 1 | Commercial | ☐ |
| 2002 | Acura MDX Touring | $36,995 | 31,697 | | Karen Radley Acura VW | SUV | Black | 16 mi. | 1 | Private | ☐ |
| 2002 | Acura MDX Touring | $36,900 | 23,880 | 📷 | Chevy Chase Acura | SUV | Black | 17 mi. | 2 | Private | ☐ |
| 2002 | Acura MDX Touring | $36,880 | 22,394 | 📷 | Lindsay Lexus of Alexandria | SUV | Black | 15 mi. | 1 | Private, Lease | ☐ |
| 2002 | Acura MDX Touring | $34,995 | 41,061 | 📷 | Karen Radley Acura VW | SUV | Black | 16 mi. | 2 | Rental | ☐ |
| 2001 | Acura MDX Touring | $34,995 | 31,789 | 📷 | Radley Acura | SUV | GrayCertified | 15 mi. | 2 | Private, Lease | ☐ |
| 2001 | Acura MDX Touring | $33,995 | 46,525 | 📷 | Radley Acura | SUV | GrayCertified | 15 mi. | 2 | Private | ☐ |
| 2002 | Acura MDX Touring | $33,988 | 26,000 | 📷 | Pohanka Acura | SUV | GOLD | 3 mi. | 1 | Private | ☐ |
| 2001 | Acura MDX | $33,500 | 34,120 | 📷 | Chevy Chase Acura | SUV | Gray | 17 mi. | 2 | Private | ☐ |
| 1995 | Acura NSX T | $32,995 | 77,229 | 📷 | Radley Acura | Coupe | Green | 15 mi. | 4 | Rental, Private | ☐ |
| 2001 | Acura MDX Touring | $32,995 | 61,751 | 📷 | Radley Acura | SUV | GrayCertified | 15 mi. | 3 | Private | ☐ |
| 2001 | Acura MDX Touring | $32,995 | -- | | Classified Ad | SUV | | 3 mi. | 0 | --- | ☐ |
| 2002 | Acura RL 3.5 | $32,988 | 9,745 | 📷 | Pohanka Acura | Sedan | PEARL WHITE | 3 mi. | 1 | Private | ☐ |
| 2002 | Acura RL 3.5 | $32,900 | 19,677 | 📷 | Chevy Chase Acura | Sedan | Black | 17 mi. | 1 | Private | ☐ |
| 2001 | Acura MDX Touring | $32,887 | 30,566 | 📷 | Rosenthal Acura | SUV | Green | 21 mi. | 3 | Private, Lease | ☐ |
| 2001 | Acura MDX Touring | $32,599 | 26,228 | 📷 | Leesburg Honda | SUV | Champagne | 18 mi. | 2 | Private | ☐ |
| 2001 | Acura MDX | $32,500 | 44,507 | 📷 | Chevy Chase Acura | SUV | Black | 17 mi. | 2 | Private | ☐ |
| 2001 | Acura MDX Touring | $32,500 | 40,309 | 📷 | Fairfax Motors, Inc. | SUV | Maroon | 4 mi. | 2 | Private | ☐ |
| 2001 | Acura MDX | $31,995 | 44,067 | 📷 | Radley Acura | SUV | BlackCertified | 15 mi. | 2 | Lease, Private | ☐ |
| 2002 | Acura RL 3.5 | $31,995 | 33,042 | 📷 | Radley Acura | Sedan | BlueCertified | 15 mi. | 2 | Private | ☐ |
| 2002 | Acura RL 3.5 | $30,995 | 25,293 | 📷 | Radley Acura | Sedan | SilverCertified | 15 mi. | 2 | Private | ☐ |

FIG. 12

CARFAX Ownership Check /660

🖹 Run Another Report   🖳 Print Report

Ownership History:

 CARFAX estimates that this 1996 ACURA NSX-T (JH4DC4456TS012781) had 3 owner(s). CARFAX analyzed this vehicle's title history and other supporting events to identify potential ownership transfers. In compliance with the U.S. privacy laws, CARFAX does not collect or report owner names or addresses.

| Estimated Owners: | Date: | Location: | Owner Type: |
|---|---|---|---|
| 1st owner | 04/16/1996 | Delaware | Rental |
| 2nd owner | 06/25/1999 | Maryland | Private |
| 3rd owner | 04/03/2001 | District of Columbia | Private |

FIG. 14

SYSTEM AND METHOD FOR GENERATING INFORMATION RELATING TO HISTORIES FOR A PLURALITY OF VEHICLES

This application is a continuation-in-part of application Ser. No. 10/619,542, filed Jul. 16, 2003, the contents of which are incorporated herein by reference.

TECHNICAL FIELD

This invention relates to a system and method for generating records related to the history of a vehicle and, in particular, to a system and method for determining the number of owners for a plurality of vehicles and/or displaying a listing of the plurality of vehicles based on the number of owners.

BACKGROUND OF THE INVENTION

The automotive industry is perhaps one of the largest industries in many industrialized regions of the world. As a result, the market for used vehicles has evolved into a substantial market, especially in North America, and in particular, the United States and Canada.

Those parties involved in the trading of used vehicles recognize the value of information relating to the used vehicle's history in making a purchasing decision including placing a value on the particular vehicle. Consequently, services have been created that function primarily to provide vehicle history information to various parties in the used vehicle market, including dealers and individual consumers. For example, Carfax, Inc., the assignee of the present invention, provides a variety of vehicle history information to both buyers and sellers of vehicles. In particular, Carfax offers a web site at www.carfax.com™, permitting a potential buyer of a vehicle to purchase a vehicle history report containing an extensive collection of information on a particular vehicle. For example, the vehicle history report includes such vehicle history information as model year, odometer readings, accident information, the existence of salvage and/or flood titles and maintenance records.

Perhaps one of the most important pieces of information to a potential buyer about a used vehicle is the number of prior owners. Vehicle owners have varied and unpredictable driving habits and maintenance practices. Therefore, the greater the number of owners, the greater the likelihood that the vehicle has problems, such as hidden damage or excessive wear, due to, for example, aggressive driving and/or poor maintenance. Moreover, a vehicle owned by only one individual throughout the vehicle's history is more likely to have been cared for by the owner to maximize dependability, appearance and resale value, especially during a long ownership period.

Furthermore, another important piece of information to a potential buyer about a used vehicle is how the vehicle was used. For example, a vehicle that was previous used as a taxi cab or a rental vehicle is more likely to have been abused compared to vehicles owned by a private individual and used by the individual for everyday use.

Therefore, there exists an unfulfilled need for a system and method for generating vehicle history records that accurately and effectively determines whether a transfer of ownership of a vehicle occurred during its history. This allows accurate determination of the number of owners for a plurality of vehicles. There further exists an unfulfilled need for such a system and method that allows generation of a listing of the plurality of vehicles based on the determined number of owners, and further allows sorting thereof. Moreover, there exists an unfulfilled need for such a system and method that allows identification of vehicles based on the number of owners, or how the vehicle was used.

SUMMARY OF THE INVENTION

Determining whether a transfer of ownership has occurred for a particular vehicle is difficult and complex, even if records of the vehicle's history are readily available. Title/registration data may be provided by, for example, a government agency such as, in the U.S., the Department of Motor Vehicles, or equivalent of the states in which vehicles are registered. Thus, first impression suggests that, because vehicle history data provides title/registration records resulting from the number of owners can be easily determined by counting the number of title/registration records that have been issued for a particular vehicle. However, the applicants of the present invention have found that such title/registration records do not necessarily indicate transfer of ownership as it relates to the potential purchaser of the vehicle.

Examples of title records provided in a vehicle history by a vehicle data supplier that appear to indicate ownership transfer but in reality represent situations in which no ownership transfer has occurred include title error corrections, lien discharges and duplicate titles. Another example is a new title record provided when the owner of a vehicle moves from one state to another state. Although a new title is issued by the state where the owner has moved to, the owner is actually the same. Therefore, in these and other instances, simple counting of the title/registration records throughout a vehicle's history would not ensure accurate information regarding the number of owners for a particular vehicle.

In accordance with one aspect of the present invention, a method for generating information relating to vehicle histories of a plurality of vehicles is provided. The method includes the steps of identifying records in a database, the records being related to a particular vehicle and having information relating to the particular vehicle's history, identifying a target record in the records, the target record being indicative of ownership of the particular vehicle, identifying a trigger record in the records, determining if the target record indicates an ownership transfer in which ownership of the particular vehicle is transferred from one owner to another owner based on the identified trigger record, determining the number of owners of the particular vehicle, repeating the above steps for records in the database related to another vehicle, and displaying a listing of vehicles including the number of owners corresponding to the vehicles listed.

In another embodiment, the method includes the steps of identifying target records in a database having information relating to vehicle histories of the plurality of vehicles, the target records being indicative of ownership of the plurality of vehicles, determining a total number of owners for each of the plurality of vehicles based on the target records, and displaying a listing of vehicles including the number of owners corresponding to each vehicle listed.

In still another embodiment, the method includes the steps of identifying target records in a database having information relating to vehicle histories of the plurality of vehicles, the target records being indicative of ownership of the plurality of vehicles, determining if each of the target records indicates an ownership transfer in which ownership of a vehicle is transferred from one owner to another owner, determining an ownership type for each target record determined to be indicative of an ownership transfer for each of the plurality of vehicles, and displaying a listing of vehicles including the determined ownership type for each listed vehicle.

In accordance with yet another embodiment of the present invention, a method for generating information relating to vehicle histories of a plurality of vehicles includes the steps of entering at least one criterion into an online vehicle advertisement web site, identifying a plurality of vehicles in the online vehicle advertisement web site that satisfy the at least one criterion entered, determining the number of owners for each of the plurality of vehicles in the listing, and displaying a listing of the identified plurality of vehicles that satisfy the at least one criterion entered with corresponding number of owners for the listed vehicles.

Another aspect of the present invention is a vehicle history information system adapted to generate information relating to vehicle histories of a plurality of vehicles. In one embodiment, the vehicle history information system includes a database having vehicle history records, each vehicle history record relating to vehicle history of a particular vehicle, a vehicle history report module adapted to retrieve the vehicle history records for each of the plurality of vehicles from the database, an ownership module adapted to identify target records indicative of ownership for each of the plurality of vehicles, identify trigger records and determine whether the target records indicate ownership transfers in which ownership of the plurality of vehicles is transferred between owners based on the identified trigger records, and to determine a number of owners for each of the plurality of vehicles, and a user interface module adapted to generate a displayable listing of vehicles with the determined number of owners for the listed vehicles.

In another embodiment, the vehicle history information system includes a database having vehicle history records, each vehicle history record relating to vehicle history of a particular vehicle, a vehicle history report module adapted to retrieve the vehicle history records for each of the plurality of vehicles from the database, an ownership module adapted to determine an ownership type for each of the plurality of vehicles, and a user interface module adapted to generate a displayable listing of vehicles and the determined ownership type for the vehicles listed.

In still another embodiment, the vehicle history information system includes a user interface module adapted to allow entry of at least one criterion into an online vehicle advertisement web site, a database having vehicle history records, each vehicle history record relating to vehicle history of a particular vehicle, a vehicle history report module adapted to retrieve the vehicle history records for each of the plurality of vehicles from the database, and an ownership module adapted to determine the number of owners for each of the plurality of vehicles, wherein the user interface module is further adapted to generate a displayable listing of vehicles satisfying the criteria with corresponding number of owners for each vehicle listed.

In accordance with still another aspect of the present invention, a computer readable medium is provided having instructions to implement one or more of the methods and systems noted.

These and other features of the present invention will become more apparent from the following detailed description of the preferred embodiments of the present invention when viewed in conjunction with the accompanying drawings.

BRIEF DESCRIPTION OF THE DRAWINGS

FIG. 4 is an example displayable file of a user interface that may be generated by the vehicle history information system of the present invention.

FIG. 5 shows an example report summary that may be generated and displayed by the vehicle history information system which specifically identifies the number of owners.

FIG. 9 shows various vehicle history records for an example vehicle.

FIG. 10A shows various vehicle history records for another example vehicle.

FIG. 10B shows the vehicle history records of FIG. 10A with the appropriate target record clearly indicated by a first owner data flag.

FIG. 11A shows various vehicle history records for still another example vehicle.

FIG. 11B shows the vehicle history records of FIG. 11A with the target records clearly indicated with various flags.

FIG. 12 shows one example of a listing in accordance with another aspect of the present invention which lists a plurality of vehicles and their corresponding number of owners and ownership types.

FIG. 14 shows an example ownership page that provides more detailed information regarding the owners.

DETAILED DESCRIPTION OF THE PREFERRED EMBODIMENT

Figure 1:
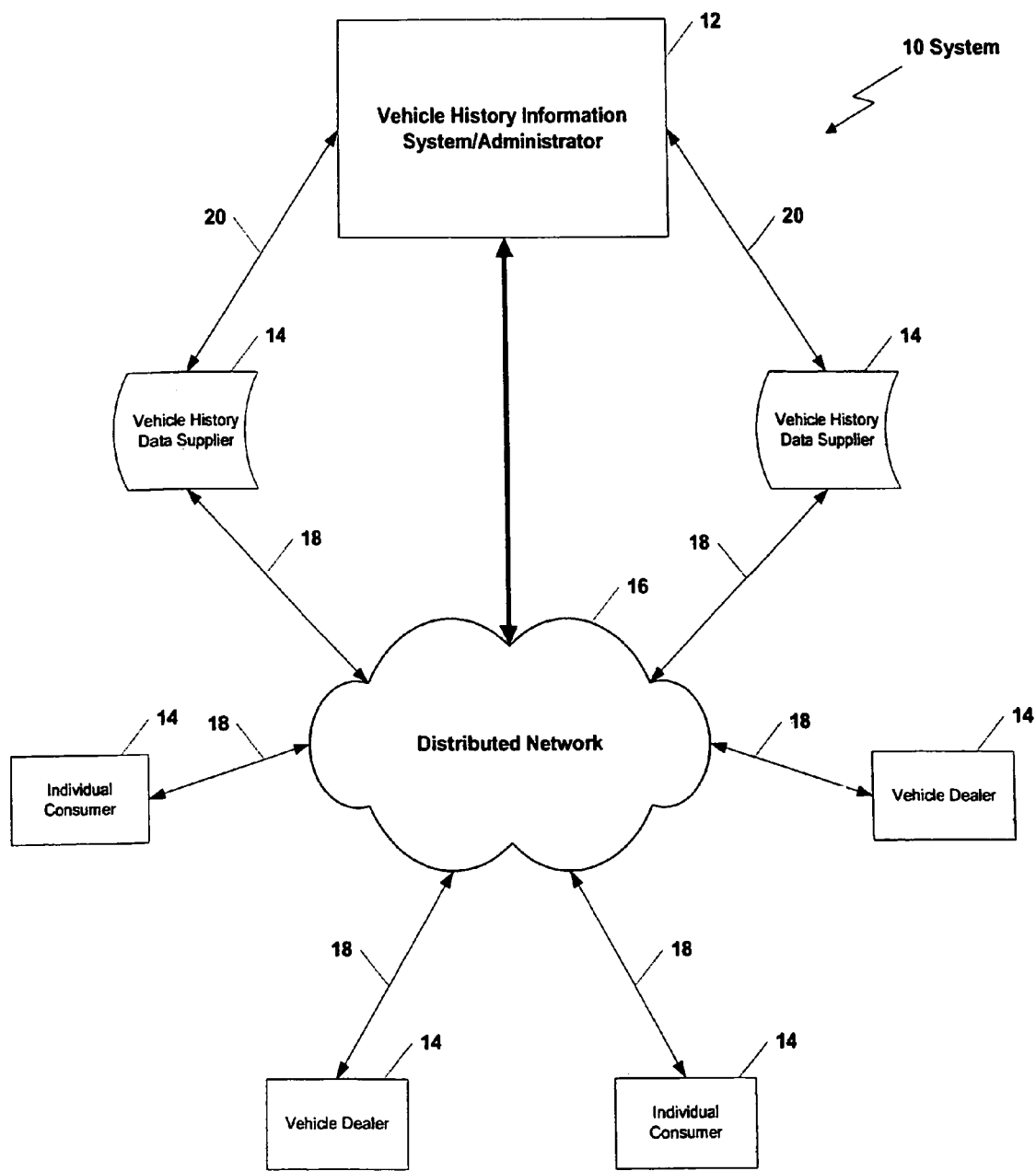
FIG. 1 is a general schematic illustration of a vehicle history information system in accordance with one aspect of the present invention connected to various data suppliers and a distributed network.

Referring to the drawings, FIG. 1 is a highly schematic diagram of a system, for example in the form of a computer network 10, designed to implement the subject invention. FIG. 1 may also be viewed as showing the relationship of the different entities potentially involved in the application of one embodiment of the present invention. Specifically, a computer implemented vehicle history information system 12 exchanges data with a plurality of remote terminals 14 through data transmission across a distributed network 16, e.g. Internet. The terminals 14 represent individual consumers and vehicle dealers accessing vehicle history information system 12, as discussed more fully hereinbelow, to obtain vehicle history information about a particular vehicle. Terminals 14 may also include vehicle history data sources or suppliers which are used by the vehicle history information system administrator to create and update vehicle history information in system 12. The vehicle history data suppliers may include individual consumers, vehicle dealers, state titling offices, Department of Motor Vehicles, auto auctions and any other source of vehicle information.

The distributed network 16 may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, terminals 14 may be connected to distributed network 16 by any conventional communication links 18, including hardwired and/or wireless. Moreover, the vehicle history data suppliers may provide information to vehicle history system administrator 12 via any means of effectively communicating vehicle history information, including conventional telephone, facsimile and/or mail services indicated at 20.

Figure 2:
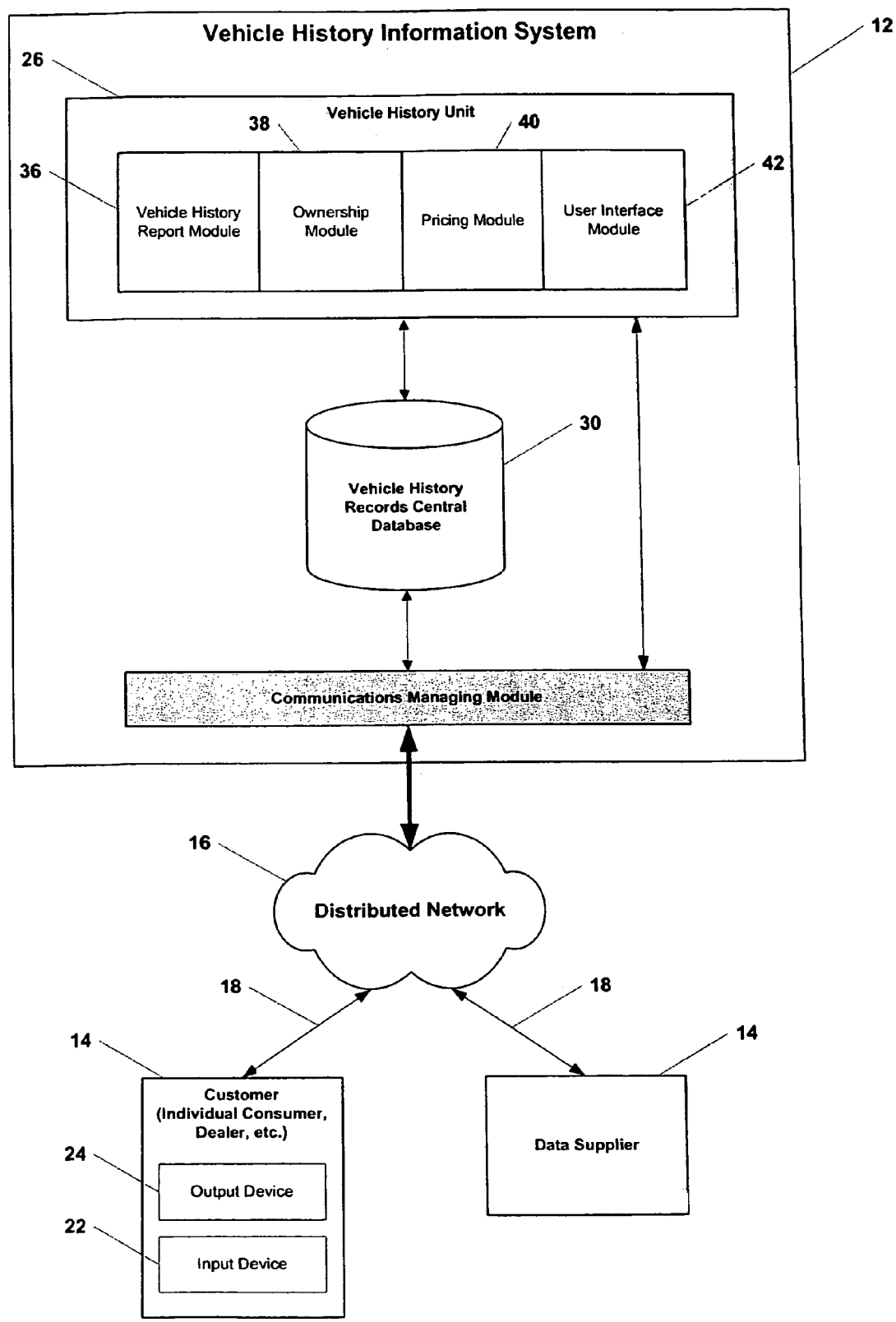
FIG. 2 is a detailed schematic illustration of the vehicle history information system in accordance with one implementation of the present invention.

FIG. 2 illustrates in more detail the vehicle history information system 12 in accordance with one embodiment of the present invention. Generally, vehicle history information system 12 may be implemented with any type of appropriate hardware and software, with portions residing in the form of computer readable storage medium having executable instructions, and computer architecture as discussed hereinbelow. Vehicle history information system 12 may be implemented using a server, personal computer, a portable computer, a thin client, etc. or any combination of such devices. In this regard, vehicle history information system 12 may be a single device at a single location as shown, or multiple devices at a single, or multiple, locations that are connected together using any appropriate communication protocols over any communication medium such as electric cable, fiber optic cable, any other cable, or in a wireless manner using radio frequency, infrared, or other technologies.

FIG. 2 also illustrates in more detail the preferred implementation of the terminals 14. Although only one terminal is shown in detail as the customer terminal, which may include the individual consumers and vehicle dealers of FIG. 1, the details of the customer terminal 14 are equally applicable to the data supplier terminal and all other terminals. Terminal 14 may be any appropriate device for accessing vehicle history information system 12 such as a personal computer, portable computer, thin client, a handheld device such as a mobile phone or PDA, and the like. Terminal 14 includes an input device 22 and an output device 24 which allow the user of the terminal 14 to provide information to, and receive information from, vehicle history information system 12 via the distributed network 16. In this regard, the input device 22 may include a keyboard, mouse, etc. as well as data input devices such as memory devices based on magnetic, optical and/or solid state technologies including disc drives, CD/DVD drives, flash memory, etc. The output device 24 may include a monitor screen, printer, etc. that allow the user of the terminal 14 to obtain the vehicle history information from vehicle history information system 12.

Referring to FIG. 2, in the preferred embodiment, vehicle history information system 12 includes a vehicle history unit 26, a vehicle history records central database 30, and a communications managing module 34, all of which are connected together for effective data communication. Vehicle history unit 26 in one implementation shown includes a vehicle history report module 36, an ownership transfer module 38, a pricing module 40, and a user interface module 42, the functions of each being further described hereinbelow.

It should be noted that the vehicle history information system 12 and the vehicle history unit 40 in accordance with the embodiment of the present invention is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the present invention as schematically embodied in FIG. 2 should not be construed to limit the vehicle history information system 12 of the present invention, but be understood to merely be a schematic example.

Vehicle history records central database 30 contains a comprehensive collection of vehicle history data arranged, organized, indexed and/or retrievable based on the unique vehicle identification number (VIN) of a particular vehicle. Each vehicle sold within the United States and most foreign countries has a unique VIN which is identified on nearly every vehicle title issued and physically identified on the respective vehicle. The VIN is the key to identifying and tracing the public record of each vehicle and to associating different vehicle data collected from a variety of sources with the correct particular vehicle. Thus, as used herein, the phrase "particular vehicle" refers to only one physical vehicle associated with a single VIN and does not refer to general model level information or categories of vehicles, for example, relating to a particular make, model and/or year.

As previously mentioned, the administrator of vehicle history information system 12 acquires vehicle history data from a variety of data suppliers 14. Each item of data acquired and entered into central database 30 is associated with a particular VIN and thus a particular vehicle. The vehicle data is added as a record to central database 30 and indexed by the VIN. When a report is requested as discussed hereinbelow, all records indexed by the same VIN are selected.

Central database 30 may be any conventional database capable of effectively storing collections of records in an organized accessible manner to permit efficient easy access to desired pieces of data, i.e. one or more records, for example, associated with a particular VIN, using appropriate database management system software. Preferably, central database 30 receives information from, and may be accessed by, all components of vehicle history information system 12. The information stored in central database 30 may include, for example, the VIN (which indicates make, model and year); accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information, and any other information relevant to the vehicle's history. This information is preferably used to create corresponding vehicle records stored in the database and associated with a particular VIN for retrieval, processing and/or display.

In the preferred embodiment, a vehicle history unit 26 includes appropriate hardware and software for implementing the various modules necessary to perform the functions of the vehicle history information system described herein.

Vehicle history unit 26 may be implemented as a general purpose computing device with a central processing unit (CPU) or processor. The software for operating the vehicle history unit 26 and of the various modules may reside in a computer readable storage medium in the form of encoded executable instructions for operating the system and performing the functionalities and process steps described herein.

Vehicle history report module 36 functions to access database 30 and retrieve the appropriate records associated, for example, with a particular VIN upon the request by a user. Thus, module 36 includes the appropriate software necessary to select the appropriate vehicle history records from database 30 based on a particular request, i.e. VIN. The vehicle history report module 36 may further be adapted to arrange and organize the vehicle history records and information in a manner appropriate for further data processing and/or display.

User interface module 42 is adapted to utilize the information provided by the vehicle history report module 36 to generate a user interface for delivery to output device 24 of customer terminal 14. User interface module 42 is adapted to generate particular electronically displayable files for delivery to, and display by, output device 24 of customer terminal 14. Communications managing module 34 is adapted to manage communications and interactions between vehicle history information system 12 and its various components, and with the various terminals 14 via the distributed network 16.

Figure 3:
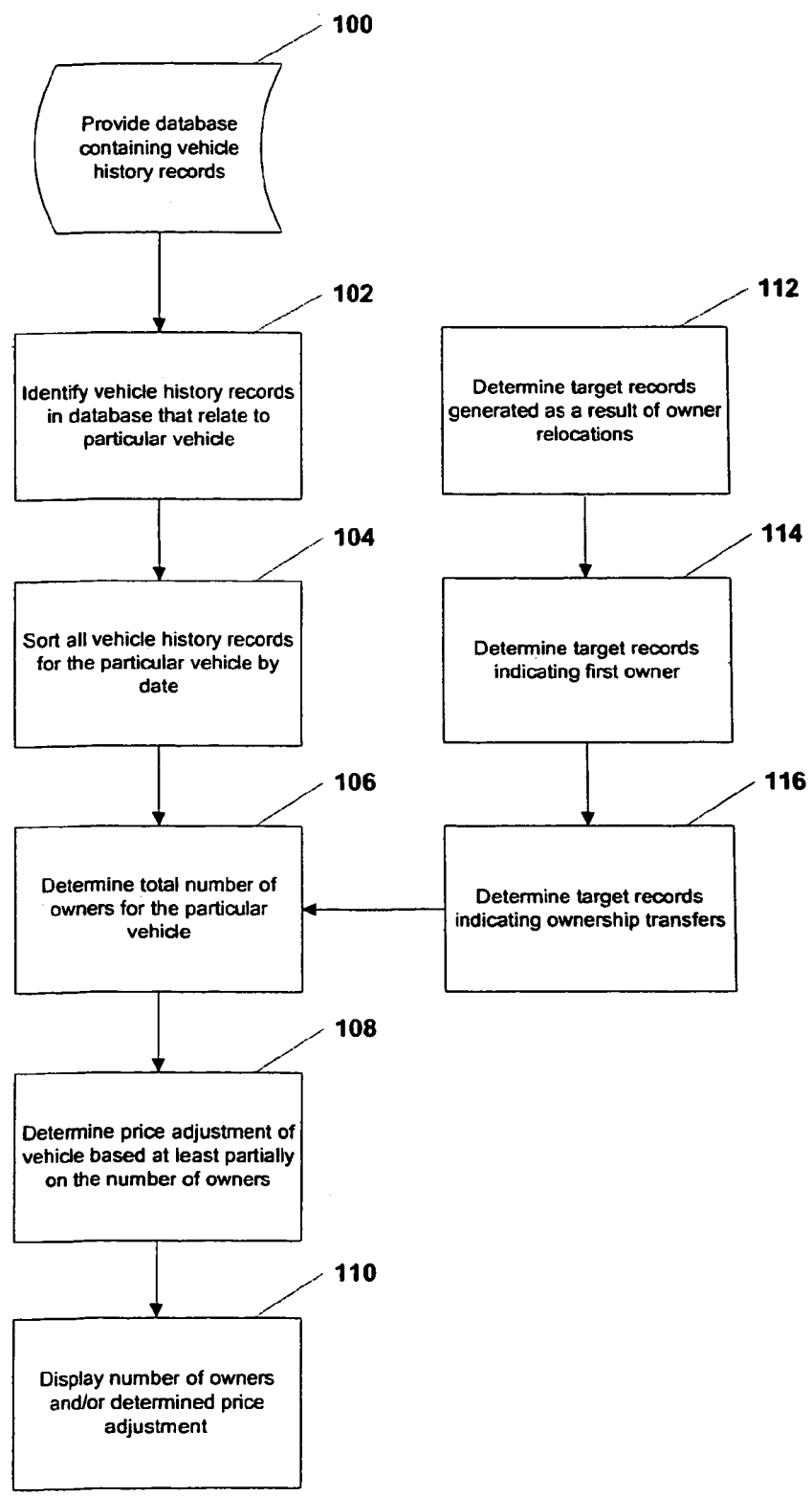
FIG. 3 is a flow diagram of an exemplary method in accordance with another aspect of the present invention.

Referring to FIG. 3, a general representation of the preferred method, corresponding to the system of the present invention of FIG. 2, is illustrated in the form of a flow diagram starting with step 100 in which the vehicle history record central database 30 containing vehicle history records, is provided by, for example, the vehicle history information system administrator. Next, in step 102, vehicle history report module 36 identifies vehicle history records in the central database 30 that relate to a particular vehicle.

Typically, step 102 is performed in response to a customer, i.e. individual consumer or dealer, providing the VIN of a particular vehicle to vehicle history information system 12. In the preferred embodiment, the customer accesses a website containing electronically displayable files having user interfaces for permitting simple, automated communication between the customer and system 12 via distributed network 16. For example, as shown in FIG. 4, an electronically displayable file including a user interface 101 is displayed on the output device 24 of the customer's terminal 14. The customer then enters the particular vehicle's VIN in an input field 103 and elects a "continue my order" button 105 to submit the VIN to system 12 for processing. The VIN request is received by the vehicle history information system 12, via communications managing module 34, which processes the request utilizing vehicle history unit 26.

In the illustrated implementation, vehicle history report module 36 processes the request by selecting all of the vehicle history records in central database 30 relating to a particular VIN in step 102 of FIG. 3. The vehicle history report module 36 of the present implementation is further adapted to sort all the vehicle history records for the particular vehicle, for example, by the dates of the records as shown in step 104.

Using the retrieved records from the central database 30, the vehicle history unit 26 further processes the records using the various modules to allow accurate determination of the number of owners for a particular vehicle in step 106, and, preferably, to provide a vehicle price adjustment based on the number of owners for the particular vehicle in step 108. In this regard, the applicants of the present invention have recognized that generally, vehicles having been owned by fewer owners command a higher value in the marketplace in compared to similar vehicles that have a higher number of owners in the vehicle's history.

Prior art systems known in the art that provide vehicle history information presently cannot provide accurate determination regarding the number of owners for a particular vehicle. As previously noted, first impression suggests that, because vehicle history data provides title/registration records, the number of owners can be easily determined by counting the number of title/registration records that have been issued for the vehicles. However, such title/registration records do not necessarily indicate transfer of ownership since in reality ownership transfer does not occur in certain situations even though a title/registration data is supplied and/or a record for those particular situations exists. For example, situations involving duplicate titles, lien discharges, title error correction and owner relocation/moving, result in new title/registration records where in fact no transfer in vehicle ownership has occurred. Therefore, simple counting of the title/registration records would not ensure accurate determination of the number of owners for a particular vehicle.

A system and/or method capable of providing vehicle price adjustments based on the number of owners is presently not available and the ability to provide such adjustments is made especially difficult because there is no known method for determining the number of owners in a substantially automated manner.

In view of the above, the system and/or method of the present invention generally identifies those title/registration records, hereinbelow referred to as target records, that relate to a particular VIN without initially knowing which title/registration records represent an actual ownership transfer and which do not. The system and/or method then determines which title/registration records qualify as representing ownership and which title/registration records do not likely represent actual vehicle ownership transfers, by identifying and/or comparing other information and records, hereinbelow referred to as trigger records. Specifically, in the preferred embodiment, the system and/or method looks for one or more of these other records within predetermined time interval limits around the dates of the title/registration records that suggest or support, or do not suggest or support, the existence of an actual ownership transfer. Then, based on certain factors, such as the type of the other records and/or the chronological positioning of the other records relative to time interval limits, the system and/or method concludes whether or not a particular title/registration record qualifies as an ownership transfer record.

Specifically, the ownership module 38 of the vehicle history unit 26 is adapted to accurately determine the total number of owners in step 106 based on the vehicle history records that are stored in the central database 30. In this regard, the ownership module 38 is adapted to recognize when a record is generated as a result of the owner of the vehicle moving or relocating to a different state which results in the issuance of a new title and/or registration in step 112. In addition, in step 114, the ownership module 38 accurately determines which vehicle history record identifies first ownership of the vehicle thereby indicating the first owner. Furthermore, in step 116, the ownership module 38 determines which of the vehicle history records indicate ownership transfers. The number of owners may be counted using a subroutine or other appropriate algorithm. Of course, a vehicle generally only has one owner at any given time, whether the owner is an individual or a legal entity. Hence, it should be understood that the number of owners as used herein refers to the total number of owners of a particular vehicle identified through the vehicle's history records, which would include the past owners.

The number of owners determined in step 106 can then be used by the pricing module 40 to determine an adjustment in the price of the vehicle based on the number of owners so that the price is based at least partially on the number of owners as shown in step 108. Finally, in accordance with the illustrated method of FIG. 3, the number of owners, the determined price adjustment and/or a final adjusted price is displayed for the user of the vehicle history information system 12. For example, FIG. 5 shows a report summary that may be displayed which specifically identifies the total number of owners in the field 107. Of course, the total number of owners may be displayed in any manner and the display as shown in field 107 of FIG. 5 is merely one example. In this regard, the total number of owners may be provided to the user of the vehicle history information system 12 in any manner such as in a report summary paragraph, under a separate header, or as a bulleted listing. Furthermore, FIG. 5 also shows an example report summary that may be displayed which specifically sets forth the determined price adjustment in the price adjustment field 581 as described in further detail below.

Figure 6:
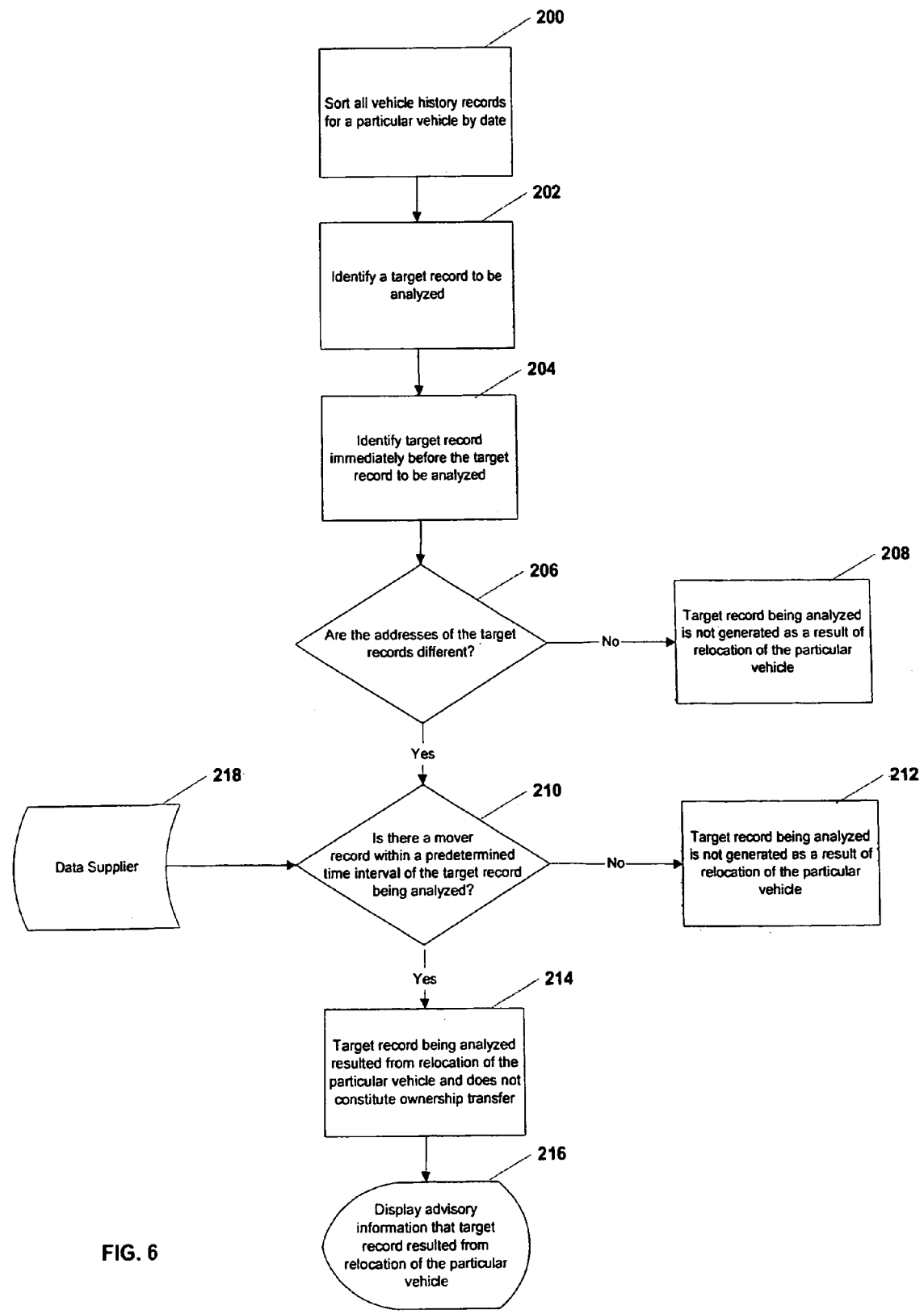
FIG. 6 shows a flow diagram of an exemplary method for determining whether a vehicle history record is generated based on relocation of the owner of the vehicle from one region to another region.

FIG. 6 shows a flow diagram of an exemplary method in which the ownership module 38 can determine whether a vehicle history record suggestive of ownership transfer, is in fact indicative of an ownership transfer, or is generated based on relocation of the owner of the vehicle from one region to another region, for example, from one state to another state, which typically requires issuance of a new title and/or registration by a registration or titling agency, such as the DMV of the new state. In particular, as shown in FIG. 6, the method executed by the ownership module 38 of the illustrated embodiment includes step 200 in which all of the vehicle history records for a particular vehicle is sorted by date. In step 202, a target record is identified, the target record being an issued title and/or registration and having a date and an issuing region such as a state, associated thereto. For example, a target record may be a title issued by the Commonwealth of Virginia on a particular date.

The method also includes step 204 in which a previous target record that immediately precedes the target record being analyzed is identified, the previous target record also having a date and an issuing region associated thereto. Then the method of the present embodiment includes the step of determining whether the issuing regions of the target records are different. If the issuing regions are not different, the target record being analyzed does not qualify as a relocation as shown in block 208 since the target records have the same issuing regions and another target record can then be analyzed.

However, if the issuing region of the target record being analyzed is different from the issuing region of the previous target record, the ownership module 38 searches the vehicle history records for a mover record within a predetermined time interval of the target record being analyzed as set forth in step 210. The predetermined time interval, for example, may be within approximately 60 days before the date of the target record being analyzed, and within approximately 30 days after the date of the target record being analyzed. Of course, in other embodiments, other time intervals may be used instead.

If the mover record is not found in step 210, the ownership module 38 determines that the target record being analyzed does not qualify as a relocation as shown in block 212 and another target record can then be analyzed. However, if there is a mover record within the predetermined time interval of the second target record, the ownership module 38 determines that ownership transfer did not occur between the target record being analyzed and the previous target record, and that the target record being analyzed resulted from relocation of the owner of the vehicle to a different issuing region as shown in block 214. Furthermore, the ownership module 38 may be further adapted to display an advisory informing that the second target record is related to the relocation of the vehicle without ownership transfer as shown in block 216.

Referring to step 210 in which the ownership module 38 looks for a mover record within a predetermined time interval, a mover record is any vehicle history record indicating that a relocation or a move has occurred. In one implementation, the mover records are preferably stored in the central database 30 along with other vehicle history records, and associated with a particular VIN. The mover records may be provided by, or created from relocation or mover data provided by, any vehicle history data supplier 218. Upon obtaining such data or records from a vehicle history data supplier, a mover record is generated and stored in the vehicle history records central database 30 for each instance in which a relocation is indicated by the data supplier 218.

Thus, in accordance with the method of FIG. 6, the ownership module 38 of the vehicle history unit 26 identifies which of the target records are generated as a result of a relocation by the owner of the vehicle, and not as a result of an actual ownership transfer. Such target records that result from relocation of the owner do not count as being an ownership transfer since, in fact, the owner of the vehicle has not changed.

Figure 7:
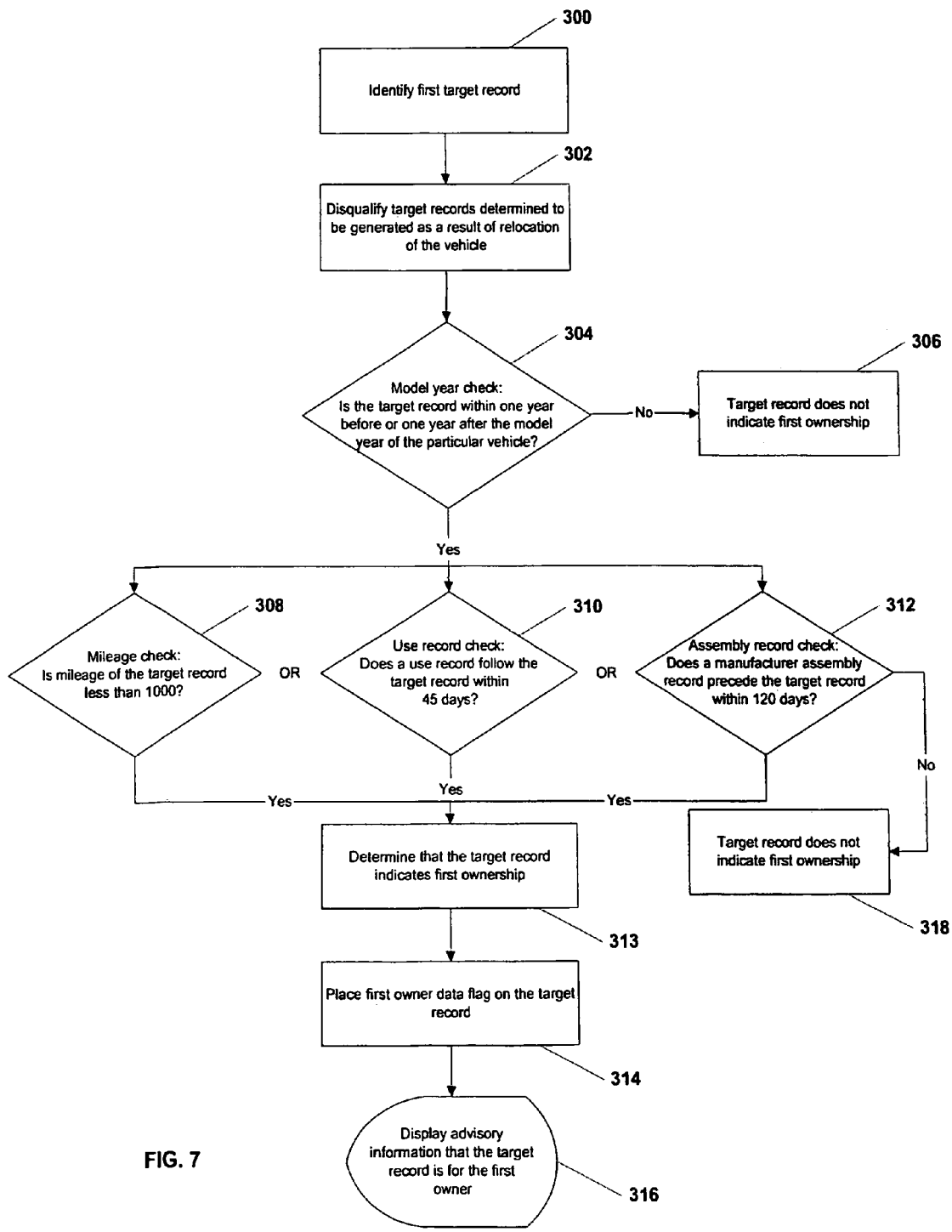
FIG. 7 shows a flow diagram of an exemplary method for determining which target record indicates first ownership.

Referring again to FIG. 2, in addition to determining which of the target records are generated by relocation and do not actually indicate ownership transfer, the ownership module 38 of the vehicle history unit 26 is further adapted to determine which of the target records stored in the vehicle history record central database 30 is indicative of the first ownership of the particular vehicle, and thereby, identify the target record indicating the first owner. In this regard, FIG. 7 shows a flow diagram which describes one method that may be implemented by the ownership module 38 to determine which target record indicates first ownership.

In accordance with the illustrated method, a first target record for the particular vehicle is identified in step 300. Target records that are indicated as being generated as a result of an ownership relocation are disqualified in step 302 so that they are not eligible to be considered as a first ownership record. As previously described, the target records may be determined to be generated as a result of an ownership relocation in accordance with the method of FIG. 6, or in any other appropriate manner.

Then, in accordance with the present embodiment, each target record is further analyzed in the manner described hereinbelow to determine whether the target record is indicative of first ownership. In particular, a model year check is conducted in step 304 on the target record by determining whether the date of the target record is within a predetermined time interval from the vehicle's model year. The predetermined time interval may be within approximately one year before, or within approximately one year after, the model year of the vehicle. Of course, the one year time interval is provided as an example only and a different time interval may be used in alternative embodiments. If the date of the target record is not within the predetermined time interval from the vehicle's model year, the target record is determined to not indicate a first ownership as shown in block 306 and another target record can then be analyzed.

However, if the target record being analyzed is within the predetermined time interval from the vehicle's model year in step 304 so that the target record may be indicative of first ownership, further analysis is conducted. In particular, if the target record and the data associated therewith satisfy any one of the checks set forth in steps 308, 310 or 312, the target record is determined by the ownership module 38 to be indicative of first ownership.

As shown, in step 308, a mileage check is conducted to determine whether the odometer data of the particular target record being analyzed is less than a predetermined number of miles, for example, less than 1,000 miles. If the mileage is less than 1,000 miles, the target record being analyzed is determined to be indicative of first ownership. Alternatively, in step 310, if a use record follows the target record within a predetermined time period such as within 45 days, the ownership module 38 determines that the target record being analyzed is indicative of first ownership. The use record may be a vehicle history record indicating a particular type of use such as government use, commercial use, company use, lease use, etc. which has been registered with a government agency, such as the DMV. It should be noted that in many regions, such use records are actually registrations. In this regard, it should be evident that trigger records may also be certain types of target records as well in accordance with the present invention.

As a further alternative, an assembly record check is performed in step 312 in which it is determined whether a manufacturer assembly record precedes the target record being analyzed within a predetermined time period, for example, within approximately 120 days. The manufacturer assembly record is a record indicating the completion date of assembly for the particular vehicle and may further provide location information where the vehicle was manufactured. If such a manufacturer assembly record is present, the ownership module 38 of the vehicle history unit 26 determines that the target record analyzed is indicative of first ownership.

As previously discussed, if any of the checks set forth in steps 308, 310 or 312 are satisfied, the target record being analyzed is determined to be indicative of first ownership by the ownership module 38. If none of the tests 308-312 are satisfied, the target record being analyzed is determined to be not indicative of a first ownership as shown in block 318 and another target record can then be analyzed. Of course, in other implementations, not all three checks need be provided. In addition, alternative/different checks may be provided in addition to, or in substitute of, the checks discussed above that provide confirming evidence to facilitate identification of the first owner. Furthermore, in an alternative embodiment, any combination of two or more checks may be necessary before a target record is determined to be indicative of first ownership.

Alternatively, the registration records themselves may be utilized to ascertain whether a target record is indicative of first ownership. For example, if for some reason, the above described method of FIG. 7 does not result in identification of a target record indicating first ownership, the registration records of the particular vehicle may be examined, and the first registration record indicating an ownership type may be determined as indicating first ownership. In particular, registrations typically indicate ownership type such as "Personal Use", "Leased Vehicle", "Rental", "Government", "Fleet", "Commercial", "Taxi", or "Non-profit" corresponding to the intended use of the vehicle as described in further detail below. Such registrations indicating ownership type is generally required in most jurisdictions in the U.S. Thus, the first target record that is indicative of the first owner is likely to be a registration indicating an ownership type. Of course, the above methods described are merely examples of how the target record that is indicative of first ownership can be determined, and in other embodiments, other methods may be used.

Upon determining that a target record indicates first ownership, a first owner data flag is placed on the target record in step 314 and preferably, an advisory is displayed to the user informing that the target record indicates first ownership in step 316. Thus, the ownership module 38 of the vehicle history unit 26 allows accurate determination of the first ownership of the particular vehicle as described above so that the number of owners for the particular vehicle can be determined. In addition, the ownership module 38 further allows determination of which target records are generated based on relocation by the same owner so that these target records are not counted as being ownership transfers as described previously.

Figure 8:
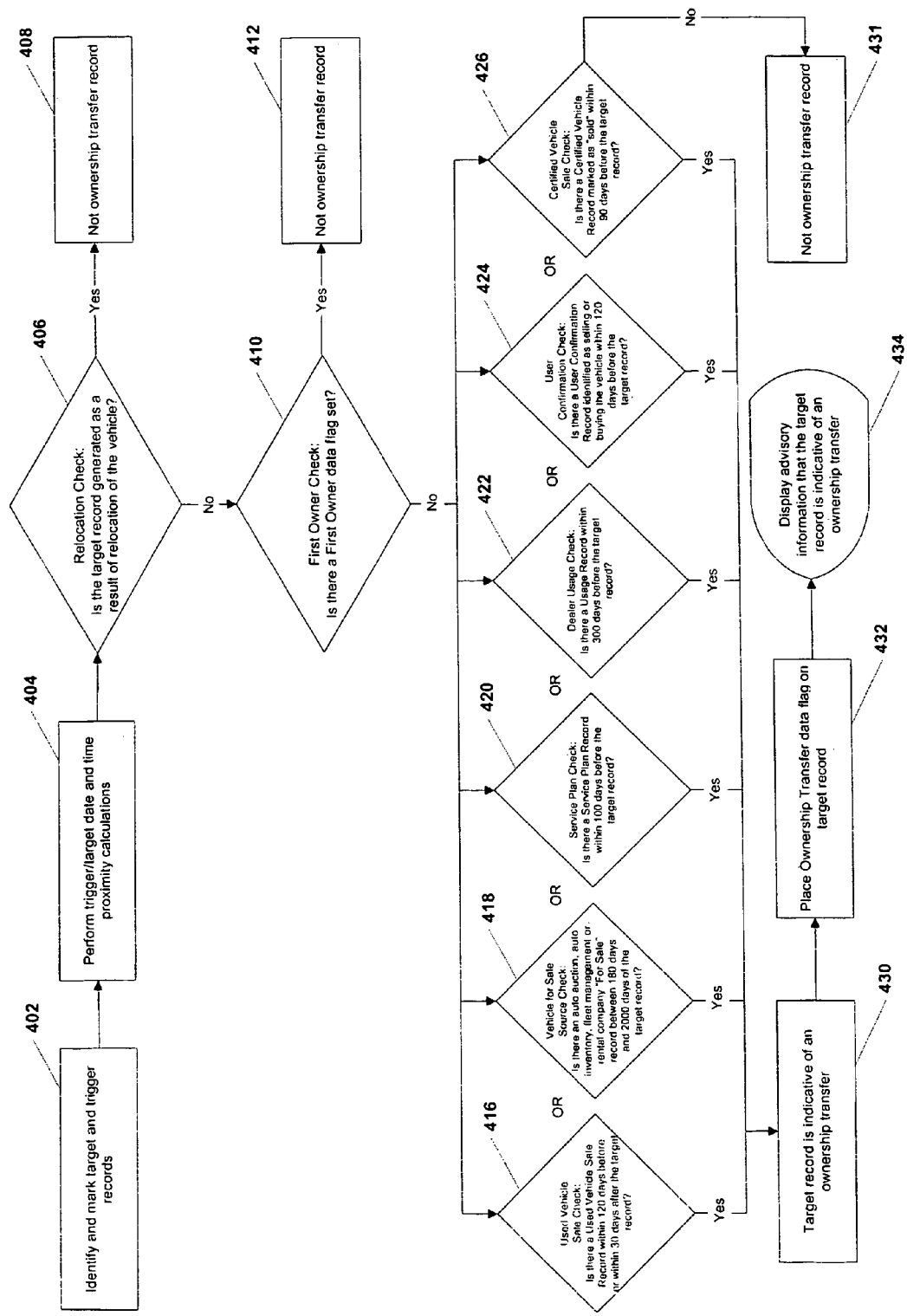
FIG. 8 shows a flow diagram of an exemplary method for determining whether a target record is indicative of an ownership transfer.

Using the above methods, the ownership module 38 in accordance with the illustrated embodiment is further adapted to analyze the vehicle history records of a particular vehicle to determine the total number of owners of the particular vehicle by determining which of the other target records indicate ownership transfers as indicated in step 116 of FIG. 3. FIG. 8 shows a flow diagram of a method that may be used by the ownership module 38 in accordance with one exemplary embodiment of the present invention to determine whether the target records of the vehicle history records stored in the central database 30 are indicative of ownership transfers.

In accordance with the illustrated embodiment, all target records and trigger records of the central database 30 that are associated with a particular vehicle being analyzed are located and marked in step 402. As previously noted, target records are typically issued title records and registration records provided by, for example, the DMV. Trigger records, on the other hand, are specific record types from a particular group of vehicle history data suppliers or from a specific data source. As explained in further detail hereinbelow, such trigger records are used to determine whether a particular target record is indicative of an ownership transfer.

Referring again to FIG. 8, proximity calculations are performed with the target records and the trigger records of the vehicle history records of a particular vehicle in step 404 by determining the time interval between the target records and the trigger records based on the dates of these records. Then, in accordance with the illustrated embodiment, a mover record check is performed in step 406 for each of the target records. This may be attained, for example, in the manner described previously relative to FIG. 6, to determine whether there exists a mover record within a predetermined time interval of the target record. If the target record being analyzed is determined to be generated by the relocation of the vehicle owner, the target record is determined to be not indicative of ownership transfer as shown in block 408 and is disqualified from further analysis so that another target record can be analyzed. Such disqualified target records would not be counted in the determination of the total number of owners in step 106 as shown in FIG. 3.

If the target record being analyzed is not generated as a result of relocation, the target record is further examined in step 410 to determine whether there is a first owner data flag associated thereto, such data flag possibly having been placed in accordance with the method described above relative to FIG. 7, for example. If the target record being analyzed has a first owner flag associated thereto, then the target record is not to be considered as an ownership transfer record as shown in block 412 so that another target record can be analyzed.

If the target record is not disqualified in step 406, or flagged as first ownership record in step 410, the target record is further analyzed by the ownership module 38 in the manner described hereinbelow using various trigger checks 416-426 based on the determined time intervals between the target record and the trigger records that are derived in the proximity calculation step 404. The satisfaction of any one of these trigger checks 416-426 indicates that the target record is indicative of an ownership transfer.

In accordance with the present implementation, a target record is determined to indicate an ownership transfer of the vehicle if the time interval between the target record being analyzed and the trigger record as determined in the proximity calculation step 404 is within a time interval limit that is associated with each of the trigger records of the trigger checks. In this regard, the time interval limits may be a number of days before the date of the target record and/or a number of days after the date of the target record.

In the used vehicle sale check of step 416, the trigger record is a used vehicle sale record that is provided by a third party vehicle data provider such as car dealer that sells used vehicles and, possibly, new vehicles as well. The used vehicle sale record preferably indicates that the vehicle was sold by the car dealer. The time interval limit associated with the used vehicle sale record may be within approximately 120 days before the date of the target record and within approximately 30 days after the date of the target record. Thus, if the ownership module 38 finds a used vehicle sale record within approximately 120 days before the date of the target record, or within approximately 30 days after the date of the target record, the target record is determined to indicate an ownership transfer in step 430.

In the vehicle for sale source check of step 418, the trigger record is a vehicle for sale record from an organization such as an automotive auction, an automotive inventory source, a dealer, a fleet management company, a rental company, or the like. The vehicle sale record indicates that the vehicle, still in possession by the organization such as the auction or dealer, is for sale. The time interval limit associated with the vehicle for sale record trigger may be within approximately 2000 days before the date of the target record. Thus, if a vehicle for sale record trigger exists for the particular vehicle which is within approximately 2000 days before the date of the target record, the target record is determined to be indicative of an ownership transfer in step 430. Of course, it should be noted that in other embodiments, the vehicle for sale records from different organizations may be associated with different time interval limits. For example, vehicle for sale records provided by a fleet management company may utilize a different time interval (such as 300 days before the date of the target record).

A service plan check is conducted in step 420 where the trigger record is a service plan record indicating purchase of an extended warranty or service plan for the particular vehicle. Such records may be obtained through a third party data supplier including providers of such extended warranties or service plans. The time interval limit that is associated with the service plan record trigger may be within approximately 100 days before the date of the target record. Thus, if a vehicle history record indicates that a service plan has been purchased for the vehicle satisfies the time interval limit noted, the target record is determined to be indicative of ownership transfer in step 430.

In step 422 of FIG. 8, a dealer usage check is performed in which the trigger record is a dealer usage record indicating retrieval of the particular vehicle's history records from the central database 30 by a dealer accessing the vehicle history information system 12, for example, via the distributed network 16. The time interval associated with the dealer usage record may be within approximately 300 days before the date of the target record. Thus, if a dealer usage record exists within 300 days before the target record, the target record is determined to be indicative of an ownership transfer in step 430.

In step 424 as shown in FIG. 8, a user confirmation check is performed in which the trigger is a user confirmation record that indicates the sale of the vehicle. The user confirmation record may be generated based on inputted information from user responses to a questionnaire or a survey that the vehicle has been sold. The time interval limit associated with the user confirmation record may be within approximately 120 days before the date of the target record. Thus, if a user confirmation record exists within the designated time interval limit, the target record is determined to be indicative of an ownership transfer in step 430.

Finally, a certified vehicle sale check is conducted in step 426 in which the trigger record is a dealer sale record indicating sale of a certified vehicle. The vehicle may be certified by the administrator of the vehicle history information system 12 of the present invention. In such an instance, the term "certification" refers to the accuracy of the title and mileage information provided by the vehicle history information system 12 of the present invention, and not to the vehicle's actual mechanical condition. Alternatively, or in addition thereto, the vehicle may be certified by a manufacturer. In such an instance, the term "certification" refers to the fact that the condition of the vehicle is backed by the manufacturer. In particular, to be certified, a vehicle satisfying mileage and year requirements set by the manufacturer, is inspected by a dealer to determine whether the vehicle's mechanical condition meets manufacturer's certification requirements. These certification requirements also generally include certifying title and mileage information. Vehicles meeting the manufacturer's certain inspection criterion is certified by the manufacturer, and sold as a "Certified Pre-Owned" vehicle, generally with extended warranty terms.

The dealer sale record of a certified vehicle may take the form of an inventory list in which the dealer can designate certain vehicles as being sold or otherwise unavailable for sale. The time interval limit associated with the dealer certified vehicle sale record may be within approximately 90 days before the date of the target record. Thus, if a dealer certified vehicle sale record is found that satisfies the time interval limit in step 426, the target record is determined to be indicative of an ownership transfer in step 430. Of course, it should be noted that in other embodiments, the certified vehicle sale records may be associated with different time interval limits, depending on whether the certification is merely for the mileage and title accuracy, or also for the actual mechanical condition of the vehicle. For example, Certified Pre-Owned vehicle sale records may be associated with a time interval of 180 days before the date of the target record.

As noted previously, if any of the above described trigger checks 416 to 426 are satisfied, the target record is determined to be indicative of an ownership transfer in step 430 so that the ownership transfers can be counted and provide an accurate number of owners for the particular vehicle. However, if none of the trigger checks are satisfied, the target record is determined to be not indicative of an ownership transfer as shown in block 431 so that another target record can be analyzed.

In accordance with the illustrated embodiment, the method as shown in FIG. 8 also places an ownership transfer data flag on the target records that have been determined to indicate ownership transfer in step 432. This facilitates a preferable step of displaying advisory information to the user in step 434 which informs that a particular target record is indicative of an ownership transfer. Moreover, this also facilitates determination of the total number of owners since the total number of owners can be determined by determining the total number of ownership transfer data flags and increasing it by one to include the first owner.

It should be noted that the time interval limit that are associated with each of the trigger records described above are merely illustrative examples and different time interval limits may be used. However, the applicants of the present invention have found that the noted time interval limits provide a reliable indicator for determining whether a target record, in fact, corresponds to an actual ownership transfer. It should also be noted that these trigger checks may be conducted in the order described, or in any other appropriate order, or may be even conducted simultaneously. Because the target record is determined to be indicative of an ownership transfer if one of these trigger checks are satisfied in the present embodiment, the remaining trigger checks need not be performed thereby conserving the processing requirements of the vehicle history information system 12.

In addition, it should also be noted that in other implementations, not all six trigger checks described above need be provided. Alternative/different trigger checks may be provided in addition to, or in substitution for the checks discussed above to provide confirming evidence to identify actual ownership transfers. Furthermore, in an alternative embodiment, any combination of two or more of the trigger checks may be necessary before a target record is determined to be indicative of ownership transfer.

Thus, it should be apparent to one of ordinary skill in the art that the present invention should not be limited to the triggers and trigger checks described above. For example, in certain states and jurisdictions, title numbers are used which indicates the number of owners. In particular, the state of Pennsylvania utilizes title numbers that indicate the number of owners in the state of Pennsylvania with respect to a particular vehicle. Various other states also change the title number only when there is an ownership transfer. Thus, such title numbers may be used to determine whether a target record is indicative of an ownership transfer and change in the title numbers be used as a trigger record.

The ownership module 38 of the vehicle history unit 26 may also be used to identify target records that do not indicate ownership transfer. One such target record was discussed above (i.e. relocation) but other such target records may also be identified. In particular, duplicate titles, lien discharge, and correction to titles, all represent target records that do not indicate ownership transfer. For example, a target record such as a title that is issued by the state within close proximity to, for instance, a month or two, of an auction sale mostly likely means that a duplicate title was requested for the particular vehicle to be sold. This titling event would, therefore, not be identified as an ownership transfer, but as a duplicate title request by the ownership module 38.

The capability to identify various target records as not indicating an ownership transfer is especially advantageous for analyzing vehicles having been owned in various states such as Ohio, Kentucky, Pennsylvania, and Nebraska that require dealers taking possession of the vehicle to title the vehicles on their lots. The ownership module 38 of the vehicle history unit 26 may be adapted to interpret such titling events which merely show the dealers taking possession of the vehicle as not being an ownership transfer or a first owner as generally understood by consumers.

Furthermore, the ownership module 38 may be further adapted to determine registration patterns which may be used to determine whether a target record is indicative of an ownership transfer. In particular, there is typically a one year or so gap between each vehicle registration. Registration events that are out of sync with that pattern, in conjunction with an absence of a mover record in close proximity would indicate a new owner for the particular vehicle. Thus, such registration pattern may be used to identify target records that are not indicative of ownership transfer.

In addition, the ownership module 38 of the vehicle history unit 26 may be further adapted to utilize cross sell records as trigger records indicative of ownership transfer. In particular, such cross sell records indicate cross selling activities that typically take place around a sale, or a purchase, of the particular vehicle and may be provided by a third party data provider or the like. The service plan check of step 420 described previously above is one example of such cross selling activity, consumers typically purchasing such plans during, or shortly after, the purchase of the vehicle. Thus, as described, the ownership module 38 utilizes the trigger record associated with a service plan purchase as a trigger record for determining whether a target record is indicative of an ownership transfer in step 430.

In a similar manner, various different cross selling records may be utilized as trigger records as well or as alternatives to determine whether a particular target record is indicative of ownership transfer and/or first ownership. For example, prepurchase inspections, preinsurance inspections and/or insurance purchase may be used as trigger records that indicate the target record is in fact, indicative of an ownership transfer or a first ownership for the vehicle. In addition, various subscription services may be used as triggers as well. For example, activation or change of subscriber for vehicle safety services such as OnStar™ and/or LoJack™ may be used as triggers to determine whether the target record is indicative of an ownership transfer. Likewise, activation/change of subscriber for other vehicle related services such as satellite radio services (XM™ radio) may also be used to determine whether a target record is indicative of an ownership transfer in step 430. Of course, such trigger records may be provided by a third party data provider or be obtained by another manner.

Also, various other trigger records may be utilized by the vehicle history information system 12 to determine whether a particular target record is indicative of an ownership transfer. For example, newspaper and online classified records preceding a titling event set forth in the target record would likely provide a good indication that the vehicle ownership has been transferred. Such trigger records may be extracted from publicly accessible databases, for example, via the Internet.

Various other events or records indicating particular events may be utilized by the ownership module 38 of the vehicle history unit 26 to facilitate determination of whether a target record indicates an ownership transfer or not, such events or records being obtained through a third party data provider or other appropriate data sources. For example, lien and loan records that are associated with the title of the vehicle can be used to identify ownership transfers. Such lien and loan records may be records indicating discharge of such loans or liens. Lemon titles and/or manufacturer buyback records which brand the vehicle's title means that the vehicle has been repurchased by the manufacturer, and the title event will therefore, not be determined as indicating ownership transfer or first owner as generally understood by consumers. Vehicles having salvage titles typically means that the insurance company has repurchased the vehicle as a result of an insurance claim. Furthermore, a repossession record may be provided in the vehicle history records which indicates that the financial institution, from which a vehicle loan was contracted, took ownership of the particular vehicle. The described target records associated with such titling events would not be determined to be indicative of an ownership transfer or first ownership by the ownership module 38 as generally understood by consumers.

Other events or records may be utilized by the ownership module 38 to determine that a particular target record is indicative of ownership transfer. For example, dealer reconditioning records can also be used as trigger records, such dealer reconditioning records indicating that the dealer is preparing the particular vehicle for sale. Insurance information such as new policies, total loss claims, and loss/theft claims may also be used as trigger records to determine whether a specific target record is indicative of an ownership transfer. For certain types of vehicles, U.S. customs and NHTSA import records can identify a vehicle being imported into the United States. Such records can also be used as trigger records to identify the first ownership or ownership transfer. Again, data indicating such events or records may be provided by third party data providers or be obtained in any other appropriate manner.

The ownership module 38 may further be adapted to analyze customer supplied data, for example, through the user interface module 42 and the distributed network 16, where customers can add records into a vehicle's history. Such data would preferably include references to vehicles being purchased or sold with associated dates.

Moreover, various life events of the owner of the particular vehicle being analyzed may be utilized as trigger records to determine whether a target record is indicative of an ownership transfer, such life events being typically marked by the purchase or sale of a vehicle. For example, a severe accident will sometimes lead an owner to sell the vehicle because of bad memories associated with the vehicle. Marriage, divorce, children, issuances of drivers permit or driver licenses are events that are often linked to the purchase of a vehicle. Identifying such events in close proximity to a target record may qualify the target record as being indicative of an ownership transfer or a first ownership record. Credit activity may also identify a family as being in the market for a vehicle, and therefore, their vehicle may be prone to change of ownership. Thus such credit activity may be indicative that the target record associated thereto is an ownership transfer.

Of course, the above noted records and events that may be utilized by the ownership module 38 of the vehicle history unit 26 are merely provided as examples only and other records may be used to aid in determining whether ownership transfer has occurred. Moreover, whereas certain records may be utilized as trigger records, other records and events may be utilized by the ownership module to determine other aspects of the vehicle's ownership history, for example, as described above relative to relocation.

Therefore, in view of the above discussion, it should be now evident to one of ordinary skill in the art how the method as described above relative to FIGS. 3-8 may be utilized by the vehicle history system 12, and in particular, the ownership module 38 of the vehicle history unit 26, to determine the total number of owners for the particular vehicle as shown in step 106 of FIG. 3. Once the total number of owners for the particular vehicle is determined in any appropriate manner, the price adjustment of the vehicle may be determined based at least partially on the number of owners as indicated in step 108 of FIG. 3.

FIG. 9 shows various vehicle history records 500 for a 1999 Acura Integra, the vehicle history records 500 being fabricated and discussed hereinbelow to demonstrate how such vehicle records may be used by the vehicle history information system 12 of the present invention to determine whether a particular target record is indicative of a first owner as discussed above relative to FIG. 7. Thus, the flow diagram of FIG. 7 should be referred to in conjunction with the vehicle history records of FIG. 9 to facilitate understanding.

FIG. 9 shows the various vehicle history records 500 that are retrieved from the central database 30 and which have already been sorted by date in accordance with step 300 of the flow diagram in FIG. 7. In accordance with the present embodiment, the ownership module 38 of the vehicle history unit 26 then identifies the target record for analysis as set forth in step 302. As previously noted, target records are typically issued titles or registrations associated with the vehicle. Thus, in the example vehicle history records 500 of FIG. 9, the first target record 501 is the title or registration issued by Virginia DMV on Mar. 9, 2001 at an odometer reading of 10,854.

In step 302, the target records that are determined to be a result of relocation are disqualified, for example, based on the method as set forth above relative to FIG. 6. Thus, the ownership module 38 of the vehicle history unit 26 looks for a mover record within a predetermined time interval of the first target record. In the example of FIG. 9, a mover record 502 exists having the date of Feb. 28, 2001, approximately nine days before the first target record 501, the relocation record indicating that the vehicle owner relocated. Thus, in accordance with step 302, the target record 501 is disqualified since it is not indicative of first ownership.

It should be noted that the above vehicle history records 500 of FIG. 9 are merely provided as an example and preferably, the mover records are not displayed to customers that are accessing the vehicle history information system 12, but are merely used by the ownership module 38 to determine whether a specific vehicle history record is generated due to a relocation, and to determine the first owner. As previously described, mover record 502 may be obtained from a third party data provider which compares and analyzes the name and address of a new vehicle registration, to the name and address of the previous vehicle registration to provide relocation records to the vehicle history information system 12 of the present invention.

It should further be noted that in the illustrated example discussed above, the target record 501 would also fail the model year check of step 304 described previously because the date of the target record (Mar. 9, 2001) is more than one year after the model year of the vehicle, namely a 1999 Acura Integra in the present example. Therefore, even if a mover record 502 was not present, the target record 501 would still be determined to not indicate first ownership as shown in block 306 of FIG. 7.

FIG. 10A shows vehicle history records 510 for a 2001 Buick LeSabre that illustrates another example of how the ownership module 38 of the vehicle history unit 26 determines whether a particular target record indicates first ownership as described above relative to FIG. 7. The first target record 512 is identified in accordance with step 300, the first target record being the title or registration issued by the Maryland DMV on Apr. 25, 2001 with an odometer reading of 15 miles. Because there is no mover record within a predetermined time interval of the target record 512, the target record 512 is not generated as a result of relocation of the vehicle, and is not disqualified in accordance with step 302. A model year check is conducted in step 304 and because the target record has a date of 2001 and the particular vehicle is a 2001 Buick LeSabre, the model year check is satisfied and further analysis of the target record is conducted using one or more checks described above relative to FIG. 7.

More specifically, mileage check of step 308 is conducted and satisfied by the target record 512 because the target record indicates 15 miles for the vehicle which is well within the mileage limit set forth for the mileage check. Thus, because one of the checks has been satisfied by the target record being analyzed, the ownership module 38 determines that the target record 512 indicates first ownership, only one of the checks needing to be satisfied for this determination as described previously above relative to steps 308 to 312 in FIG. 7.

However, in order to provide an example of how the other checks are used, vehicle history records 510 are further analyzed in the present discussion. Again, this is for discussion purposes only since preferably, the method of the present implementation as shown in FIG. 7 merely requires one of the checks to be satisfied. In performing the use record check 310, the ownership module 38 of the vehicle history unit 26 determines whether a use record follows the target record 512 within a predetermined period of time, for example, 45 days. In the present example, a use record 514 is present which was recorded on Apr. 26, 2001, just one day after the issuance of the title or registration. As shown, the use record 514 indicates that the vehicle (2001 Buick LeSabre) was registered as a corporate fleet vehicle. Therefore, because the use record check of step 310 is satisfied, the target record 512 is determined to be indicative of first ownership in step 313.

Moreover, the target record 512 of the target records 510 further satisfies the assembly record check 312 because a manufacturer assembly record 516 precedes the target record 512 within the predetermined time period, 120 days in the present example. As can be seen, the manufacturing assembly record 516 indicates that the 2001 Buick LeSabre was assembled at a GM plant on Feb. 12, 2001 which is within 120 days of the date of the target record 512. Thus, the target record 512 would be determined to be indicative of first ownership in step 313, even if the other checks were not satisfied. Again, although the target record 512 of the vehicle history records 510 shown in FIG. 10A needs to satisfy one of the three of these checks in the preferred embodiment, all three checks were discussed to further enhance comprehension of the various checks and how they are used in conjunction with vehicle history records.

Once the target record 512 is determined to be indicative of first ownership, a first owner data flag may be placed on the target record 512 as set forth in step 314, and an advisory information is preferably displayed in step 316. In this regard, FIG. 10B shows the vehicle history records that may be displayed to the user through the output device 24 via the distributed network 16 in which the target record 512 is clearly indicated by the owner data flag "First Owner Reported".

FIG. 11A shows vehicle history records 550 for a 2001 Buick LeSabre which are retrieved from the vehicle history record central database 30 of the vehicle information system 12, and analyzed to determine whether each of the target records are indicative of an actual ownership transfer in accordance with the method as described above relative to FIG. 8. As can be seen, due to the relative complexity and the number of vehicle history records 550 that must be analyzed in the example of FIG. 11A, comments are provided on the right hand margin 552 of FIG. 11A, these comments not constituting a portion of the vehicle history record itself, but merely being provided for the understanding of the method of FIG. 8 as implemented by the ownership module 38 of the vehicle history unit 26. Thus, both FIG. 8 and FIG. 11A should be referred to facilitate understanding of the present invention.

Initially, all of the target records and trigger records are identified marked in step 402, records being indicated accordingly in the comments column 552. In particular, in the illustrated example of FIG. 11A, the first target record 554, second target record 556, and a third target record 558 are identified and marked by the ownership module 38 for analysis. Once all of the target records and trigger records have been identified in step 402, proximity calculations are conducted in 404 in which the time intervals between the target records and the trigger records are determined. Then, each of the target records are further analyzed to determine whether they are indicative of an ownership transfer.

The identified target records that are also determined to be generated as a result of a relocation, for example, using the method of FIG. 6, are disqualified and determined to not indicate ownership transfers. In the example of FIG. 11A, none of the target records are disqualified since none of them have a mover record within the predetermined time. Consequently, all of the target records may still be indicative of ownership transfer and are further analyzed in accordance with the method of FIG. 8.

A first owner check is conducted in step 410 in which the ownership module 38 looks for a first owner data flag set in the target record. As shown in FIG. 11A, the first target record 554 is provided with such first owner data flag set 560. Therefore, the first target record 554 is determined to not be an ownership transfer record in block 412. The remaining second target record 556 and the third target record 558 may still be indicative of ownership transfer if they satisfy at least one of the various trigger checks 416-426 described previously relative to FIG. 8.

In particular, a used vehicle sale check is conducted in step 416 in which a determination is made whether a used vehicle sale record trigger is present within 90 days before or within 30 days after the target record. Thus, for the second target record 556 in FIG. 11A dated Jul. 6, 2002, the used vehicle sale record 562 dated Jun. 11, 2002 exists which indicates that the vehicle was sold approximately three weeks prior to the date of the second target record 556. This is well within the time interval limit associated with the used vehicle sale record trigger. Thus, the second target record 556 is determined to be indicative of an ownership transfer in step 430.

However, no such used vehicle sale record exists for the third target record 558 dated Jun. 1, 2003 within the time interval limit associated with the used vehicle sale trigger. Thus, the third target record 558 does not satisfy the used vehicle sale check of step 416 and the vehicle sale source check of step 418 is conducted for the third target record 558. In particular, the ownership module 38 searches the vehicle history records 550 for a for sale record within a time interval limit, for example, 180 days before the date of the target record. Again, no such record exists within the time interval limit. Thus, the third target record still is not determined to be indicative of an ownership transfer.

It is worthwhile to note here that the second target record 556 satisfies the vehicle for sale source check 418 since there is a vehicle for sale trigger record 563 within the time interval limit of the second target record 556. Of course, as previously noted, in the preferred embodiment, the target records preferably need only to satisfy one of the trigger checks to be determined to be indicative of ownership transfer and the discussion of the second target record 556 satisfying the vehicle for sale source check 418 is merely provided to further clarify how the check is conducted using the trigger records.

In view of not satisfying the used vehicle sale check of step 416 or the vehicle for sale check of step 418, a service plan check is conducted for at least the third target record 558 in step 420 in which the ownership module 38 of the vehicle history unit 26 determines whether there exists a service plan record within a time interval limit before the date of the third target record 558. In the vehicle history records 550 of FIG. 11, a service plan record 564 dated Jun. 1, 2003 (same date as the third target record 558) does exists which is within the time interval limit associated with the service plan record trigger. Thus, the third target record 558 satisfies the service plan check of step 420, and is determined to be indicative of an ownership transfer in step 430.

Thus, in view of the above, each of the target records of the vehicle history records 550 shown in FIG. 11 have been analyzed to determine whether they are indicative of ownership transfer in the manner previously described relative to FIG. 8. As described, the first target record 554 was indicated as the first owner and not an ownership transfer record. However, the second target record 556 and the third target record 558 have been determined to be indicative of an ownership transfer based on one of the trigger checks. In particular, the second target record 556 satisfied the used vehicle sale check 416 while the third target record 558 satisfied the service plan check 420.

Had the second target record 556 and/or the third target record 558 not satisfied these trigger checks, the ownership module 38 of the vehicle history unit 26 would continue to analyze these target records to determine whether they satisfy the remaining trigger checks set forth in the method of FIG. 8, namely the dealer usage check of step 422, user confirmation check of step 424, and/or certified vehicle sale check of step 426. As previously described, these trigger checks are conducted in a similar manner in which each of the triggers associated with the trigger checks are associated with a time interval limit that should be satisfied by the target record for the target record to be determined to be indicative of an ownership transfer in step 430.

With respect to the above analyzed example vehicle history records 550 of FIG. 11A, the second target record 556 and the third target record 558 that have been determined to be ownership transfers are preferably flagged with an ownership transfer data flag in step 432, and are displayed with advisory information to the user of the vehicle history information system 12. For example, the ownership transfer data flags 556 and 558 with the text "New Owner Reported" may be displayed as shown in FIG. 11B.

Thus, by allowing determination of the ownership transfers that are associated with the particular vehicle, the ownership module 38 of the vehicle history unit 26 allows accurate determination of the number of owners as set forth in step 106 of the method of FIG. 3. In particular, in the example of FIG. 11A and FIG. 11B, the vehicle history records 550 for the 2001 Buick LeSabre has been analyzed to determine that it has had three owners, the first owner being reported in the first target record 554, the second owner being reported in the second target record 556, and the third owner being reported in the third target record 558.

It should be noted that there may be instances for searching vehicles where their vehicle history records do not provide enough information to determine the first owner or ownership transfers for each of the target records due to the lack of trigger records. In such instances, the vehicle history unit 26 may be adapted to display to the user, merely the available information, such as "Title or Registration Issued" or "Title Event", for example, without further indications such as the identification of the first owner or the new owner as described above.

The number of owners that is determined by the ownership module 30 of the vehicle history unit 26 in the manner described and illustrated above may be used for variety of purposes in providing vehicle history information to the user of the vehicle information system 12. In particular, in the preferred embodiment, the determined number of owners may be used to determine the price adjustment for the vehicle as set forth in step 108 of the flow diagram shown in FIG. 3. As explained, the number of owners can significantly impact the price of the vehicle and its desirability. Thus, the price module 40 of the vehicle history unit 26 is adapted to determine the price adjustment for the particular vehicle based at least partially on the number of owners as determined by the ownership module 38. Of course, in other implementations of the present invention, the total number of owners may be merely displayed to the user as information associated with the vehicle being analyzed, or used in any other manner.

The pricing module 40 may be adapted to determine the price adjustment in any appropriate manner. For example, in one implementation, each additional owner for a particular vehicle may decrease the value of the vehicle by a fixed monetary unit. Alternatively, the price adjustment may be implemented as a percentage in which the price of the vehicle is increased or decreased by a certain percentage of the vehicle's base price according to the number of owners for the vehicle.

The price adjustment that is determined by the pricing module 40 of the vehicle history unit 26 may then be displayed to the user of the vehicle history information system 12 so that the base price of the particular vehicle can be adjusted in accordance thereto. The price adjustment as determined by the pricing module 40 allows the user of the vehicle history information system 12 to increase or decrease the base price of the vehicle to take into consideration the number of owners of the particular vehicle. The base price of the vehicle represents general used car prices that takes into consideration the year, make, model and mileage of the vehicle and may further take into consideration various other factors including optional equipment present on the vehicle. Such base price of vehicles may be obtained from various third party databases that provide such pricing information.

The price adjustment for the vehicle based on the number of owners may be empirically derived so that the vehicle's base price can be adjusted upward or downward to accurately reflect the impact of the number of owners for the particular vehicle. In this regard, such empirical data indicating the amount of the price adjustment for a particular vehicle may be derived using surveys, or the price adjustments may also be assigned or otherwise be determined in any other appropriate manner.

Other ownership related factors may impact the value of a vehicle in combination with the number of owners. For example, the impact of the number of owners on the price of a vehicle will also largely depend on the age of the vehicle. A variety of factors may also impact vehicle price adjustment in conjunction with the number of owners. For example, different ownership types, various different price points of vehicles, various makes and models representing various categories or types of vehicles, ownership location patterns, ownership time patterns, and ownership mileage patterns, may all effect the vehicle price adjustment in conjunction with the number of owners. In this regard, the ownership module 38 in accordance with one embodiment of the present invention that is adapted analyze ownership information allows such factors to be taken into consideration by the pricing module 40 in determining the price adjustment.

Any appropriate method may be used by the pricing module 40 to adjust the price of the vehicle when two or more of the above noted factors are used to generate the actual adjustment of the vehicle base price. For example, in one implementation, the price adjustments for each of the various factors that are used may be simply combined together to derive a final price adjustment which is then utilized to adjust the base price of the vehicle. Of course, as previously noted, the price adjustments may also be expressed as percentages of the base price, or in any other appropriate manner. Alternatively, in another implementation, the price adjustments of each of the various factors may be applied to a mathematical formulation to derive a final price adjustment, the mathematical formulation weighing the factors differently so that certain factors influence the final price adjustment more than other factors. For example, price adjustments for each factor may be expressed as actual amounts or as percent of the base price.

As previously noted, the total number of owners for a particular vehicle that is determined by the vehicle history information system and method of the present invention, may be used for variety of purposes in providing vehicle history information. In particular, the determined number of owners may be provided on a vehicle history report and/or used to determine the price adjustment for the vehicle as described above.

In addition, in accordance with another aspect of the present invention, the vehicle history information system and method of the present invention may be utilized to determine the number of owners for a plurality of vehicles, and ownership type for the vehicles. In this regard, as described in detail below, the vehicle history information system and method may be utilized to provide a computer displayable listing of these vehicles together with their corresponding total number of owners, with or without the ownership type. For example, the present invention may be utilized to provide vehicle history information regarding a plurality of vehicles from vehicle dealer's inventory and/or an online vehicle advertisement web site. The generated listing can be implemented with sorting features, which can then be used to sort based on the number of owners and/or the ownership type. The present invention may further be utilized to provide additional search criterion in an online vehicle advertisement web site.

In the above regard, referring again to FIG. 2, the vehicle history information system 10 includes the vehicle history record central database 30 that includes vehicle history records associated with a plurality of vehicles. The vehicle history report module 36 of the vehicle history unit 26 is adapted to retrieve the vehicle history records for a plurality of vehicles from the central database 30 as previously described. The vehicle history records relating to each of the vehicles are analyzed by the ownership module 38, for example, in the manner described above, so that the number of owners for each of the plurality of vehicles are determined. Of course, it should again be understood that the number of owners as used herein refers to the total number of owners identified through a particular vehicle's history records.

Moreover, in accordance with the illustrated embodiment, the ownership module 38 may be implemented to also determine the category or ownership type for each of the owners. For example, the ownership type may include "Personal Use", "Leased Vehicle", "Rental", "Government", "Fleet", "Commercial", "Taxi", and "Non-profit". "Personal Use" is an ownership type where the vehicle was owned and used by an individual as a personal vehicle, a majority of vehicles in the U.S. being owned in this category. "Leased Vehicle" is an ownership type where the vehicle is owned by the manufacturer or other company, and is leased to an individual or a company for a predetermined lease duration. "Rental" is an ownership type where the vehicle was owned by a company that rented the vehicle to an individual or a company on a short term basis. "Government" is an ownership type where the vehicle was owned by the government (or government agency) that used the vehicle for official government business. "Fleet" is an ownership type where the vehicle was owned or sold to a company that manages vehicle fleets. "Commercial" is an ownership type where the vehicle was registered for business purposes. "Taxi" is an ownership type where the vehicle was owned by a company that utilized the vehicle as a taxi to provide transportation services. "Non-Profit" is an ownership type where the vehicle was owned by a non-profit organization that utilized the vehicle for the organization's business.

Of course, the ownership types noted above are only examples, and other ownership types may also be identified. The ownership type may be determined by the ownership module 38 in any appropriate manner. For example, the ownership module 38 may look at the registration records for this information, state registrations typically requiring proper identification of the ownership type.

The user interface module 42 may be adapted to generate a displayable listing of the plurality of vehicles and the determined number of owners corresponding thereto, with or without the corresponding ownership types. The listing may be provided by the user interface module 42 in any appropriate manner, for example, as a computer displayable file or a report that is provided to one or more terminals 14. In this regard, the user interface module 42 may be implemented with a sort function that allows the listing of plurality of vehicles to be sorted based on the number of owners as determined by the ownership module 38, the ownership type, or other parameters.

FIG. 12 shows an example listing 600 that may be provided by the user interface module 42. The generated listing 600 lists a plurality of vehicles in Vehicle column 610 together with various information regarding the listed vehicles that may be of interest to a potential buyer. For example, in the illustrated listing 600, the year, price, mileage, body style, and color of the vehicles are also provided in the rows associated with each vehicle listed in the Vehicle column 610. Moreover, a link to a photograph of the vehicle may be provided, together with identification of the seller and an indication as to where the vehicle is located.

In accordance with the illustrated embodiment of the present invention, the example listing 600 also identifies the number of owners for each of the listed vehicles in # of Owners column 620, and further identifies the ownership type in Type of Owner column 630. Thus, the first vehicle listed is a 2003 Acura NSX T with one owner identified as a "Rental" ownership type, thus, indicating that this vehicle was a rental vehicle. The second vehicle listed is a 1997 Acura NSX T with three owners identified as "Private" and "Lease" ownership types. The third vehicle listed is a 1996 Acura NSX T with two owners, both of which are identified as a "Private" ownership type. As previously noted, the number of owners for each of the listed vehicles may be determined based on target records and/or trigger records, and the type of each ownership may be determined by examining these records for this information.

As can also be appreciated, the header of # of Owners column 620 is implemented in the illustrated example of listing 600 as a link, which upon selection, sorts the listed vehicles (together with the information associated thereto) based on the number of owners. In this regard, the header of # of Owners column 620 is preferably implemented to sort the vehicles upon initial selection of the link with the fewest owners at the top of the listing 600, and the vehicles with the most number of owners at the bottom of the listing 600, and vice versa upon reselection of the link. In addition, the header of Type of Owners column 630 is also implemented in the illustrated embodiment as a link, which upon selection, sorts the listed vehicles and the associated information based on the ownership type. For example, initial selection of the link may sort the vehicles with the fewest ownership types at the top of the listing 600, and the vehicles with the most number ownership types at the bottom of the listing 600, and vice versa upon reselection of the link.

Thus, in view of the above, it should be evident that the present aspect of the invention allows generation of a listing of vehicles where information regarding the number of owners for each of the listed vehicles is provided, thereby providing information to a potential vehicle buyer that is valuable for making a purchase decision. It should also be evident that in one embodiment, information regarding the ownership type can also be provided, such information also being valuable to a potential vehicle buyer in making a purchase decision. Of course, the generated listing may be implemented as a computer displayable file or a report.

Figure 13:
FIG. 13 shows an example detailed information page showing the number of owners and the ownership types for the vehicle displayed.

It should also be noted that in the illustrated embodiment, the model name identifying each of the vehicles in the Vehicle column 610 is implemented as links so that upon selection of a link, more detailed information regarding the selected vehicle is provided by the user interface module 42. For example, upon selection of the link for the 1996 Acura NSX T, a detailed information page 650 shown in FIG. 13 may be displayed by the user interface module 42. As can be seen, further detailed information regarding the vehicle is provided in the detailed information page 650 together with the seller contact information.

In addition, the detailed information page 650 is also provided with ownership information area 652 that identifies the total number of owners for the vehicle selected in field 653, and in the illustrated embodiment, also identifies the ownership types in field 654. Thus, for the selected 1996 Acura NSX T, the number of owners is identified as being three in field 653, and the ownership types are identified as being "Rental" and "Private Use" in field 654.

In the illustrated embodiment, the ownership information area 652 is also provided with a link 656 which, upon selection, provides more detailed information regarding the owners of the vehicle such as that shown in ownership page 660 illustrated in FIG. 14. Thus, for the selected 1996 Acura NSX T, details of the three owners are shown, the ownership page 660 of the illustrated example listing a date and location where the vehicle ownership transfer occurred, and the ownership type.

The above described listing 600 of FIG. 12 which lists a plurality of vehicles together with information associated thereto, including the number of owners and the ownership type, may be useful in providing information regarding the inventory of cars for a particular dealer. In addition, example listing 600 is also especially useful when implemented with online vehicle advertisement web sites and services that allow potential vehicle buyers to search through online advertisement listings of literally thousands of vehicles based on selected search criterion such as make, model, year, price, location, etc.

Figure 15:
FIG. 15 shows an example of a search criteria menu of an online vehicle advertisement web site which can advantageously utilize the present invention.

In the above regard, FIG. 15 shows a search criteria menu 700 of an example online vehicle advertisement web site or service that may be displayed to potential vehicle buyers, for example, by a user interface module, to facilitate searching through the online advertisement listings. As can be appreciated, the search criteria menu 700 includes selection fields for make, model, year, price range and mileage range to limit the number of vehicles retrieved from the online advertisement listings. As can also be seen, the search criteria menu 700 shown in FIG. 15 includes selection fields for location/distance of the vehicle as well as keyword search and date of the listing to further limit the search results.

Furthermore, in accordance with the illustrated embodiment of the present invention, the potential buyer can also utilize the total number of owners as one of the search criteria by selecting a desired number of owners from the drop down menu 710. Preferably, upon selection of a number from the drop down menu 710, only the vehicles that have the selected number of owners, or fewer, is displayed in the generated listing thereby further limiting the results of the search. This allows the potential buyer to further tailor the vehicle search to look for vehicles that have had no more than a desired number of owners.

Moreover, the potential buyer can also utilize the ownership type as one of the search criteria by selecting one or more type selection boxes 712. In the present implementation, the search criteria menu 700 is implemented such that upon selection or checking of a particular type of selection box 712, the indicated ownership type is included in the search so that the vehicles provided in the generated vehicle list can include the ownership type indicated. In particular, the search criteria menu 700 is implemented to select all ownership types as shown in FIG. 15, so that the consumer then un-selects (i.e. removes the check by selecting) the ownership types to be excluded. Thus, if the selection boxes 712 for "Taxi" and "Fleet" are unchecked, vehicles having ownership records with these ownership types are excluded from the search results, even though they may otherwise satisfy all of the other designated criteria. Of course, the search criteria menu 700 may be implemented such that the selection boxes indicate ownership types to exclude in the search results, rather than include in the search results as shown.

It should be evident that the above described implementations of various aspects of the present invention such as the listing 600, information page 650, ownership page 660, and the search criteria menu 700 are merely provided as examples of how the present invention may be used and implemented, and the present invention is not limited thereto.

In view of the above discussion, it should now be evident to one of ordinary skill in the art, how the present invention provides a novel method and system that allows accurate determination of the number of owners for a vehicle. In this regard, as described previously, the present invention allows determination of records generated as a result of relocation, first owners, and ownership transfers. It should also be evident that the present invention may be adapted to generate a listing of a plurality of vehicles with information associated thereto, together with the number of owners, and/or ownership types for each of the vehicles. As noted, the present invention may be implemented to further allow the number of owners and/or ownership type to be used as a search criterion.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A method for generating information relating to vehicle histories of a plurality of vehicles comprising the steps of:
   identifying records in a database, said records being related to a particular vehicle and having information relating to the particular vehicle's history;
   identifying a target record in said records, said target record being indicative of ownership of said particular vehicle;
   identifying a trigger record in said records;
   determining if said target record indicates an ownership transfer in which ownership of said particular vehicle is transferred from one owner to another owner based on said identified trigger record;
   determining the number of owners of said particular vehicle;
   repeating the above steps for records in said database related to another vehicle; and
   displaying a listing of vehicles including the number of owners corresponding to said vehicles listed.

2. The method of claim 1, further including the step of sorting said listing of said vehicles based on the number of owners.

3. The method of claim 1, further including the step of determining an ownership type for each of said plurality of vehicles based on registration records.

4. The method of claim 3, further including the step of limiting the number of vehicles listed in said listing of vehicles based on at least one of a determined number of owners and an ownership type.

5. The method of claim 3, wherein said ownership type is at least one of Personal Use, Leased Vehicle, Rental, Government, Fleet, Commercial, Taxi, and Non-profit.

6. The method of claim 1, wherein said target record is at least one of a vehicle title and a vehicle registration, and said step of determining if said target record indicates an ownership transfer includes the step of determining a time interval between said target record and said trigger record based on dates of said records.

7. The method of claim 1, wherein said vehicles listed in said listing of vehicles are from at least one of an inventory of an automotive dealer, and an online vehicle advertisement web site.

8. The method of claim 1, wherein said trigger record is at least one of:
   a used vehicle sale record provided by a third party vehicle data provider;
   a vehicle for sale record from at least one of an automotive auction, an automotive inventory, a fleet management, and a rental company;
   a service plan record;
   a dealer usage record indicating retrieval of vehicle history information for said vehicle generated by said dealer accessing said database;
   a user confirmation record based on inputted information from a user questionnaire indicating sale of said vehicle; and
   a dealer sale record stored in a database of certified vehicles indicating sale of said vehicle.

9. A method for generating information relating to vehicle histories of a plurality of vehicles comprising the steps of:
   identifying target records in a database having information relating to vehicle histories of said plurality of vehicles, said target records being indicative of ownership of said plurality of vehicles;
   determining a total number of owners for each of said plurality of vehicles based on said target records; and
   displaying a listing of vehicles including the number of owners corresponding to each vehicle listed.

10. The method of claim 9, wherein said step of determining the total number of owners includes the step of determining whether each of said target records indicates an ownership transfer in which ownership is transferred from one owner to another owner by determining a time interval between said target record and a trigger record.

11. The method of claim 9, wherein vehicles listed in said listing of vehicles are from at least one of an inventory of an automotive dealer, and an online vehicle advertisement web site.

12. The method of claim 9, further including the steps of determining an ownership type for each of said plurality vehicles based on registration records of each of said vehicles, and limiting the number of vehicles listed in said listing of vehicles based on at least one of a determined number of owners, and an ownership type.

13. A method for generating information relating to vehicle histories of a plurality of vehicles comprising the steps of:
   identifying target records in a database having information relating to vehicle histories of said plurality of vehicles, said target records being indicative of ownership of said plurality of vehicles;
   determining if each of said target records indicates an ownership transfer in which ownership of said particular vehicle is transferred from one owner to another owner;
   determining an ownership type for each target record determined to be indicative of an ownership transfer for each of said plurality of vehicles; and
   displaying a listing of vehicles including said determined ownership type for each listed vehicle.

14. The method of claim 13, further including the step of determining and displaying a total number of owners for each listed vehicle.

15. The method of claim 14, further including the step of limiting the number of vehicles listed in said listing of vehicles based on at least one of a number of owners and an ownership type.

16. A method for generating information relating to vehicle histories of a plurality of vehicles comprising the steps of:
   entering at least one criterion into an online vehicle advertisement web site;
   identifying a plurality of vehicles in said online vehicle advertisement web site that satisfy said at least one criterion entered;
   determining the number of owners for each of said plurality of vehicles; and
   displaying a listing of said identified plurality of vehicles that satisfy said at least one criterion entered with corresponding number of owners for said listed vehicles.

17. The method of claim 16, further including the step of determining and displaying an ownership type for said listed vehicles.

18. The method of claim 17, further including the step of limiting the number of vehicles listed in said listing of vehicles based on at least one of a number of owners and an ownership type.

19. A vehicle history information system adapted to generate information relating to vehicle histories of a plurality of vehicles comprising:
   a database having vehicle history records, each vehicle history record relating to vehicle history of a particular vehicle;
   a vehicle history report module adapted to retrieve said vehicle history records for each of said plurality of vehicles from said database;

an ownership module adapted to identify target records indicative of ownership for each of said plurality of vehicles, identify trigger records, and determine whether said target records indicate ownership transfers in which ownership of said plurality of vehicles is transferred between owners based on said identified trigger records, and to determine a number of owners for each of said plurality of vehicles; and a user interface module adapted to generate a displayable listing of vehicles with the determined number of owners for said listed vehicles.

20. The system of claim 19, wherein said user interface module is further adapted to sort said listing of vehicles based on a number of owners.

21. The system of claim 19, wherein said ownership module is further adapted to determine an ownership type based on registration records for each of said plurality vehicles.

22. The system of claim 21, wherein said user interface module is further adapted to limit number of vehicles listed in said listing of vehicles based on at least one of a number of owners and an ownership type.

23. The system of claim 21, wherein said ownership type is at least one of Personal Use, Leased Vehicle, Rental, Government, Fleet, Commercial, Taxi, and Non-profit.

24. The system of claim 19, wherein said target record is at least one of a vehicle title and a vehicle registration, and said ownership module is further adapted to calculate a time interval between said target record and said trigger record based on dates of said records.

25. The system of claim 19, wherein said vehicles listed in said listing of vehicles are from at least one of an inventory of an automotive dealer, and an online vehicle advertisement web site.

26. The system of claim 19, wherein said trigger record is at least one of:
a used vehicle sale record provided by a third party vehicle data provider;
a vehicle for sale record from at least one of an automotive auction, an automotive inventory, a fleet management, and a rental company;
a service plan record;
a dealer usage record indicating retrieval of vehicle history information for said vehicle generated by said dealer accessing said database;
a user confirmation record based on inputted information from a user questionnaire indicating sale of said vehicle; and
a dealer sale record stored in a database of certified vehicles indicating sale of said vehicle.

27. A vehicle history information system adapted to generate information relating to vehicle histories of a plurality of vehicles comprising:
a database having vehicle history records, each vehicle history record relating to vehicle history of a particular vehicle;
a vehicle history report module adapted to retrieve said vehicle history records for each of said plurality of vehicles from said database;
an ownership module adapted to determine an ownership type for each of said plurality of vehicles; and
a user interface module adapted to generate a displayable listing of vehicles and the determined ownership type for said vehicles listed.

28. The system of claim 27, wherein said ownership module is further adapted to determine a number of previous owners for each of said plurality of vehicles based on said target records, and said user interface module is further adapted to display said determined number of owners for each of said vehicles listed.

29. The system of claim 28, wherein said user interface module is further adapted to limit the number of vehicles listed in said listing of vehicles based on at least one of a number of owners and an ownership type.

30. A vehicle history information system adapted to generate information relating to vehicle histories of a plurality of vehicles comprising:
a user interface module adapted to allow entry of at least one criterion into an online vehicle advertisement web site;
a database having vehicle history records, each vehicle history record relating to vehicle history of a particular vehicle;
a vehicle history report module adapted to retrieve said vehicle history records for each of said plurality of vehicles from said database; and
an ownership module adapted to determine the number of owners for each of said plurality of vehicles;
wherein said user interface module is further adapted to generate a displayable listing of vehicles satisfying said criteria with corresponding number of owners for each vehicle listed.

31. The system of claim 30, wherein said ownership module is further adapted to determine the number of owners for each of said plurality of vehicles based on said target records, and said user interface module is further adapted to display said determined number of owners for said vehicles listed.

32. The system of claim 30, wherein said at least one criterion includes at least one of a number of owners and an ownership type.

33. A computer readable medium for generating information relating to a vehicle's history, said medium comprising:
instructions for identifying records in a database, said records being related to a particular vehicle and having information relating to the particular vehicle's history;
instructions for identifying a target record in said records, said target record being indicative of ownership of said particular vehicle;
instructions for identifying a trigger record in said records;
instructions for determining if said target record indicates an ownership transfer in which ownership of said particular vehicle is transferred from one owner to another owner based on said identified trigger record;
instructions for determining the number of owners for said particular vehicle;
instructions for repeating the above steps for records in said database related to another vehicle; and
instructions for displaying a listing of vehicles including the determined number of owners for said vehicles listed.

34. The computer readable medium of claim 33, further including instructions for sorting said listing of vehicles based on the number of owners.

35. The computer readable medium of claim 33, further including instructions for determining an ownership type for each of said vehicles based on registration records.

36. The computer readable medium of claim 35, further including instructions for limiting the number of vehicles listed based on at least one of a number of owners and an ownership type.

37. The computer readable medium of claim 33, further including instructions for determining a time interval between said target record and said trigger record based on dates of said records.

38. A computer readable medium for generating information relating to vehicle histories of a plurality of vehicles comprising:
- instructions for identifying target records in a database having information relating to vehicle histories of said plurality of vehicles, said target records being indicative of ownership of said plurality of vehicles;
- instructions for determining if each of said target records indicates an ownership transfer in which ownership of said particular vehicle is transferred from one owner to another owner;
- instructions for determining an ownership type for each target record determined to be indicative of an ownership transfer for each of said plurality of vehicles; and
- instructions for displaying a listing of vehicles including said determined ownership type for each vehicle listed.

39. The computer readable medium of claim 38, further including instructions for determining and displaying a number of owners for each vehicle listed.

40. The computer readable medium of claim 39, further including instructions for limiting the number of vehicles listed based on at least one of a number of owners and an ownership type.

41. A computer readable medium for generating information relating to vehicle histories of a plurality of vehicles comprising:
- instructions for allowing entry of at least one criterion into an online vehicle advertisement web site;
- instructions for determining the number of owners for each of said plurality of vehicles;
- instructions for identifying vehicles in said online vehicle advertisement web site that satisfy said at least one criterion entered; and
- instructions for displaying a listing of said identified vehicles that satisfy said at least one criterion entered with corresponding number of owners for said vehicles listed.

42. The computer readable medium of claim 41, further including instructions for determining and displaying an ownership type for each vehicle listed.

43. The computer readable medium of claim 42, further including the step of limiting the number of vehicles listed in said listing of vehicles based on at least one of a determined number of owners and an ownership type.

44. A method for providing information relating to a vehicle comprising:
- providing a database having vehicle history records relating to a plurality of vehicles;
- receiving at least one search criterion including number of previous owners;
- searching said database to identify at least one vehicle that satisfies said at least one search criterion received; and
- retrieving vehicle history records for said at least one vehicle identified as satisfying said at least one search criterion.

45. The method of claim 44, wherein said received number of previous owners of said at least one search criterion is a maximum number of previous owners so that said at least one vehicle identified has no more than said received number of previous owners.

46. The method of claim 44, wherein said at least one vehicle identified is a plurality of vehicles, and further including displaying a list of said identified vehicles that satisfy said at least one search criterion together with the number of previous owners for said identified vehicles listed.

47. The method of claim 46, further including sorting said identified vehicles listed based on said number of previous owners.

48. The method of claim 44, further including generating an ownership page that displays previous ownership information associated with previous owners of said at least one vehicle identified.

49. The method of claim 48, further including grouping said previous ownership information for each previous owner for display in said ownership page, and displaying said grouped previous ownership information with a previous owner heading for each group.

50. The method of claim 48, wherein said previous ownership information includes at least one of date, location, and ownership type.

51. A method for providing information relating to a vehicle comprising:
- providing a database having vehicle history records relating to a plurality of vehicles;
- receiving at least one search criterion;
- searching said database to identify at least one vehicle that satisfies said at least one search criterion received; and
- generating an ownership page that displays previous ownership information associated with previous owners of said at least one vehicle identified, said previous ownership information being grouped for each previous owner, and being displayed with a previous owner heading for each group.

52. The method of claim 51, further including determining a number of previous owners of said at least one vehicle identified, and displaying the determined number of previous owners in said ownership page.

53. The method of claim 51, wherein said displayed previous ownership information includes at least one of date, location, and ownership type.

54. A vehicle history information system for providing information relating to a vehicle comprising:
- a database having vehicle history records relating to a plurality of vehicles;
- a user interface module adapted to allow entry of at least one search criterion including number of previous owners; and
- a vehicle history report module adapted to identify and retrieve said vehicle history records from said database for at least one vehicle that satisfies said at least one search criterion.

55. The system of claim 54, wherein said number of previous owners of said at least one search criterion is a maximum number of previous owners so that said at least one vehicle identified has no more than said number of previous owners.

56. The system of claim 54, wherein said at least one vehicle identified is a plurality of vehicles, and said user interface module is further adapted to generate a displayable list of vehicles satisfying said at least one search criterion together with the number of previous owners for said listed vehicles.

57. The system of claim 56, wherein said user interface module is further adapted to allow sorting of said displayable list of vehicles based on the number of previous owners.

58. The system of claim 54, wherein said user interface module is further adapted to generate an ownership page that displays previous ownership information associated with previous owners of an identified vehicle, said previous ownership information being grouped according to each previous owner and being displayed with a previous owner heading for each group.

59. The system of claim 58, wherein said displayed previous ownership information includes at least one of date, location, and ownership type.

60. A vehicle history information system for providing information relating to a vehicle comprising:
- a database having vehicle history records relating to a plurality of vehicles;
- a user interface module adapted to allow entry of at least one search criterion; and
- a vehicle history report module adapted to search said database to identify at least one vehicle that satisfies said at least one search criterion entered;
- wherein said user interface module is further adapted to generate an ownership page that displays previous ownership information associated with previous owners of said at least one vehicle identified, said previous ownership information being grouped for each previous owner, and being displayed with a previous owner heading for each group.

61. The system of claim 60, further including an ownership module adapted to determine the number of previous owners for said at least one vehicle identified, and wherein said ownership page generated includes the number of previous owners for said at least one vehicle.

62. The system of claim 60, wherein said displayed information includes at least one of date, location, and ownership type.

63. A computer readable medium for providing information relating to a vehicle comprising:
- instructions for accessing a database having vehicle history records relating to a plurality of vehicles;
- instructions for receiving at least one search criterion including number of previous owners;
- instructions for searching said database to identify at least one vehicle that satisfies said at least one search criterion received; and
- instructions for retrieving vehicle history records for said at least one vehicle identified as satisfying said at least one search criterion.

64. The medium of claim 63, wherein said number of previous owners of said at least one search criterion is a maximum number of previous owners so that said at least one vehicle identified has no more than said received number of previous owners.

65. The medium of claim 63, wherein said at least one vehicle identified is a plurality of vehicles, and further including instructions for displaying a list of said identified vehicles that satisfy said at least one search criterion together with the number of previous owners for said identified vehicles listed.

66. The medium of claim 65, further including instructions for sorting said listed vehicles based on said number of previous owners.

67. The medium of claim 63, further including instructions for generating an ownership page that displays previous ownership information associated with previous owners of an identified vehicle, said previous ownership information being grouped according to each previous owner and including a previous owner heading for each group.

68. The medium of claim 67, wherein said previous ownership information includes at least one of date, location, and ownership type.

69. A computer readable medium for providing information relating to a vehicle comprising:
- instructions for accessing a database having vehicle history records relating to a plurality of vehicles;
- instructions for receiving at least one search criterion;
- instructions for searching said database to identify at least one vehicle that satisfies said at least one criterion received; and
- instructions for generating an ownership page that displays previous ownership information associated with previous owners of said at least one vehicle identified, said previous ownership information being grouped for each previous owner, and being displayed with a previous owner heading for each group.

70. The medium of claim 69, further including instructions for determining a number of previous owners of said at least one vehicle identified, and displaying the determined number of owners in said ownership page.

71. The medium of claim 69, wherein said displayed information includes at least one of date, location, and ownership type.

* * * * *